United States Patent [19]

Sunamura et al.

[11] Patent Number: 5,632,190

[45] Date of Patent: May 27, 1997

[54] BURGLARPROOF DEVICE FOR HYDRAULIC MACHINE

[75] Inventors: Kazuhiro Sunamura, Tsuchiura; Osamu Tomikawa, Ibaraki-ken; Shigehiro Yoshinaga, Yokohama; Toichi Hirata, Ushiku, all of Japan

[73] Assignee: Hitachi Construction Machinery Co., Ltd., Tokyo, Japan

[21] Appl. No.: 651,587

[22] Filed: May 22, 1996

[30] Foreign Application Priority Data

May 26, 1995 [JP] Japan .................... 7-128588
May 26, 1995 [JP] Japan .................... 7-128589

[51] Int. Cl.⁶ .................................... F16D 31/02
[52] U.S. Cl. .................................... 91/459; 91/461
[58] Field of Search ............ 91/461, 459; 60/368

[56] References Cited

U.S. PATENT DOCUMENTS

| | | | |
|---|---|---|---|
| 4,615,355 | 10/1986 | Garcia et al. | 137/383 |
| 4,876,649 | 10/1989 | Kawai et al. | 364/424.05 |
| 5,138,838 | 8/1992 | Crosser | 91/461 |
| 5,149,940 | 9/1992 | Hosseini et al. | 91/461 |
| 5,441,298 | 8/1995 | Miller et al. | 280/707 |
| 5,477,770 | 12/1995 | Ono et al. | 91/461 |

FOREIGN PATENT DOCUMENTS

| | | |
|---|---|---|
| 63-116958 | 5/1988 | Japan . |
| 2-132233 | 5/1990 | Japan . |
| 4-70559 | 6/1992 | Japan . |

*Primary Examiner*—Hoang Nguyen
*Attorney, Agent, or Firm*—Fay, Sharpe, Beall, Fagan, Minnich & McKee

[57] ABSTRACT

To provide a burglarproof device for a hydraulic machine which has a high degree of security against burglary, ensures high safety, and can be simply installed in a location where the device is hard to find for burglars, a solenoid valve 23 of a burglarproof device 20 is installed in a pilot primary pressure line 3 between a pilot hydraulic pump 1 and a pilot valve device 4. Unless ten numeral keys 21a of a key input device 21 are depressed in the order of the password, an unlocking electronic circuit 22K does not generate an unlock signal and the solenoid valve 23 keeps the pilot primary pressure line 3 cut off. Therefore, a pilot primary pressure from the pilot hydraulic pump 1 is shut off and, even with a manual lever 4c of the pilot valve device 4 operated, no pilot secondary pressure is produced and a main control valve 6 is kept standstill. As a result, a hydraulic cylinder 8 is not operated and the hydraulic machine is unable to move.

20 Claims, 17 Drawing Sheets

BURGLARPROOF DEVICE FOR HYDRAULIC MACHINE

BACKGROUND OF THE INVENTION

The present invention relates to a burglarproof device for a hydraulic machine, and more particularly to a burglarproof device for hydraulic machines including construction machines such as hydraulic excavators.

Prior art burglarproof devices for hydraulic machines are disclosed in JP, A, 2-132233 and JP, A, 63-116958, for example. These burglarproof devices are designed to release start-up prevention means for an engine start-up system from an actuated state only when ten numeral keys of a 10-key input unit are depressed in the order of the password predetermined, allowing the machine to operate while any other person who does not know the password is prohibited from operating the machine. The hydraulic machine is thereby secured against burglary. Further, FIG. 1 of JP, U, 4-70559 illustrates a device constructed in a similar manner as in the above prior art for the purpose of protecting mechanics against the event that any other person may unknowingly start up the machine under service work. This prior art also has a function common to the burglar proof device in prohibiting any other person from operating the machine. In addition, FIG. 2 of JP, U, 4-70559 proposes an arrangement adapted to cut off not an engine start-up system, but an engine fuel system for the same purpose.

SUMMARY OF THE INVENTION

As explained above, the prior art burglarproof devices are designed to unlock the engine start-up system from a locked state upon the password being entered through the 10-key input unit. However, most of construction machines such as hydraulic excavators employ diesel engines in which once a starter is rotated, the engine continues rotation through self-ignition after then because of a governor sucking fuel. Therefore, even with the engine start-up system cut off, if the engine is once started up by directly coupling an external battery to a starter's motor terminal and rotating the starter, the engine continues rotation, meaning that the machine may be stolen. This results in the problem that the security against burglary is insufficient. While it is also proposed to cut off the engine fuel system, this arrangement raises a fear of leaking fuel and hence requires sufficient measures to ensure safety. Furthermore, in either case of cutting off the engine start-up or fuel system, additional parts must be installed around the engine. But because the space around the engine is small, there is a demand of avoiding such additional parts to the utmost. Still another problem is a difficulty in setting a proper location within the small space around the engine where those parts are installed in such a manner as making it hard for burglars to find them.

An object of the present invention is to provide a burglarproof device for a hydraulic machine which has a high degree of security against burglary, ensures high safety, and can be simply installed in a location where the device is hard to find for burglars.

To achieve the above object, the present invention is constituted as follows.

(1) To overcome the problems stated above, the present invention provides a burglarproof device for a hydraulic machine provided with a hydraulic system comprising a main hydraulic system including a main hydraulic pump driven by a prime mover, a plurality of actuators driven by a hydraulic fluid delivered from the main hydraulic pump, and a plurality of main control valves for controlling respective flow rates of the hydraulic fluid supplied from the main hydraulic pump to the plurality of actuators; and a pilot hydraulic circuit including a pilot hydraulic pump driven by the prime mover and controlling the main hydraulic circuit with a pilot primary pressure produced by the pilot hydraulic pump, wherein the burglarproof device comprises code input means, an unlocking electronic circuit for generating an unlock signal when a predetermined code is entered to the code input means, and lock means disposed in at lease one location in the hydraulic system for enabling the hydraulic system to operate when the unlock signal is generated, and disabling the operation of the hydraulic system when the unlock signal is not generated.

With the present invention thus constituted, when the predetermined code is entered to the code input means, the unlocking electronic circuit generates the unlock signal and the lock means enables the hydraulic system to operate. Therefore, the operator can move the hydraulic machine. To the contrary, when the predetermined code is not entered to the code input means, the unlocking electronic circuit does not generate the unlock signal and the lock means disables the operation of the hydraulic system. Therefore, the hydraulic machine is unable to move and can be protected against burglary.

Also, since the lock means is disposed in the hydraulic system, there is no need of taking safety measures against fuel leakage. Further, since the hydraulic system has many and long hydraulic lines and the lock means may be provided in one location along any of those hydraulic lines, the lock means can be easily installed in a position where it is hard to find for burglars.

(2) In the above (1), preferably, the lock means is disposed in the pilot hydraulic circuit.

Since the pilot hydraulic circuit is subjected to pressure of as low as 10 Kg/cm$^2$, for example, and has a thin pipe diameter, the installation of the lock means is easy.

(3) In the above (1), preferably, the pilot hydraulic circuit includes a common hydraulic line for transmitting the pilot primary pressure of the pilot hydraulic pump to a plurality of pilot control portions, and the lock means is disposed in the common hydraulic line.

By so providing the lock means in the common hydraulic line, it is possible to shut off the source pressure (the pilot primary pressure of the pilot hydraulic circuit) and to disable the operation of the entire pilot hydraulic circuit by only one lock means.

(4) In the above (1), preferably, the unlock signal generated by the unlocking electronic circuit is an ON electric signal, and the lock means disables the operation of the hydraulic system when the ON electric signal is not generated.

With this feature, even if the burglar notices the presence of the burglarproof device and destroys the code input means and the unlocking electronic circuit, the lock means can hold the hydraulic system in a disabled sate and protect the hydraulic machine against burglary.

(5) In the above (1), preferably, the lock means is disposed in at least one hydraulic line of the hydraulic system, and includes valve means for cutting off the hydraulic line when the unlock signal is not generated.

(6) In the above (1), the lock means may be disposed in at least one hydraulic line of the hydraulic system, and may include valve means for communicating the hydraulic line with a reservoir when the unlock signal is not generated.

(7) In the above (1), preferably, the lock means is disposed in at least two locations in the hydraulic system.

By providing the lock means in at least two locations, even if the burglar finds one of the two lock means and connects the lines on both sides of the found lock means to each other, the other undiscovered lock means still functions normally and the hydraulic machine can be protected against burglary.

(8) In the above (1), preferably, the code input means is a wireless receiver for receiving the predetermined code by radio from a wireless transmitter.

By so employing the wireless receiver as the code input means, unlike a 10-key input unit, the transmitter is not required to be provided on the dashboard surface within a cab, but can be disposed in a place behind something. It is thus possible to conceal the presence of the burglarproof device itself.

(9) In the above (8), preferably, the burglarproof device of the present invention is constituted such that the wireless transmitter stores the predetermined code beforehand and, upon operation by an operator, transmits the predetermined code to the wireless receiver by radio.

This is more convenient for the operator in that the operator is only required to carry the transmitter storing the password therein beforehand with no need of fixing the password in mind.

(10) In the above (1), preferably, the pilot hydraulic circuit includes a plurality of valve operating circuits for driving the respective main control valves in the main hydraulic circuit with the pilot primary pressure, and the lock means is disposed in at least one of the plurality of valve operating circuits.

(11) In the above (10), preferably, the hydraulic machine has a boom and an arm which are coupled to each other in a relatively vertically movable manner, the plurality of actuators include a boom cylinder and an arm cylinder for driving the boom and the arm, respectively, and the lock means is disposed in the valve operating circuit for the main control valve associated with the boom cylinder.

(12) In the above (10), the hydraulic machine may have an undercarriage, the plurality of actuators may include at least one track motor for driving the undercarriage, and the lock means may be disposed in the valve operating circuit for the main control valve associated with the track motor.

(13) In the above (10), preferably, the valve operating circuit comprises a pilot primary pressure line for transmitting the pilot primary pressure of the pilot hydraulic pump therethrough, pilot valve means connected to the pilot primary pressure line for converting the pilot primary pressure into a pilot secondary pressure, and a pilot secondary pressure line connected to the pilot valve means for transmitting the pilot secondary pressure to the corresponding main control valve, and the lock means is disposed in at least one of the pilot primary pressure line and the pilot secondary pressure line.

(14) In the above (10), preferably, the main control valve includes a spool and a pair of hydraulic driving sectors arranged at both ends of the spool to face each other, the valve operating circuit includes, as the pilot secondary pressure line, a pair of pilot secondary pressure lines connected respectively the pair of hydraulic driving sectors, and the lock means includes an on/off valve for communicating the pair of pilot secondary pressure lines with each other when the unlock signal is not generated.

(15) In the above (1), the pilot hydraulic circuit may include a pump control circuit for controlling a delivery rate of the main hydraulic pump with the pilot primary pressure, and the lock means may be disposed in the pump control circuit.

(16) In the above (1), the pilot hydraulic circuit may include a pilot relief valve for keeping the pilot primary pressure constant, and the lock means may be relief pressure regulating means provided in the pilot relief valve for reducing a setting pressure of the pilot relief valve when the unlock signal is not generated.

(17) In the above (1), the main hydraulic circuit may include a hydraulic fluid supply line for supplying the hydraulic fluid delivered from the main hydraulic pump to the plurality of main control valves, and the lock means may be disposed in the hydraulic fluid supply line.

(18) In the above (1), the main hydraulic circuit may include a main relief valve for restricting an upper limit of the delivery pressure of the main hydraulic pump, and the lock means may be relief pressure regulating means provided in the main relief valve for reducing a setting pressure of the main relief valve when the unlock signal is not generated.

(19) In the above (1), preferably, the burglarproof device of the present invention further comprises lock input means operated by an operator for instructing whether a lock state is to be set or not, and the unlocking electronic circuit comprises first unlocking control means which, at the time of turning-off of a key switch for controlling start-up and stop of the prime mover, sets the lock state and brings the unlocking electronic circuit into the system down when the lock input means instructs setting of the lock state, and sets an unlock state and brings the unlocking electronic circuit into the system down when the lock input means does not instruct setting of the lock state; and second unlocking control means which generates the unlock signal in the case of the lock state being set only when the key switch is turned on and the predetermined code is entered to the code input means, and which generates the unlock signal in the case of the unlock state being set simply when the key switch is turned on.

With the present invention thus constituted, upon the operation of the hydraulic machine being stopped, if the operator turns off the key switch and also operates the lock input means to instruct setting of the lock state, the first unlocking control means sets the lock state and brings the system down. When the operator turns on the key switch at the subsequent start-up of the hydraulic machine, the second unlocking control means generates the unlock signal only when the predetermined code is entered to the code input means, thereby enabling the hydraulic system to operate as per in the ordinary lock arrangement. On the other hand, upon the operation of the hydraulic machine being stopped, if the operator turns off the key switch alone and does not instruct setting of the lock state with the lock input means, the first unlocking control means sets the unlock state and brings the system down. At the subsequent start-up of the hydraulic machine, the second unlocking control means generates the unlock signal simply when the key switch is turned on, thereby enabling the hydraulic system to operate.

Accordingly, when the operation of the hydraulic machine is stopped in a normal manner, the system is brought down in the lock state by instructing setting of the lock state from the lock input means. Thus, the hydraulic machine cannot be operated for the start-up by persons who do not know the password, and hence can be protected against burglary. When the operator is engaged in work away from the machine for a while or takes a short pause during the work where the machine operation is frequently started up and stopped, the operator can bring the system down without instructing setting of the lock state from the lock input means. This allows the operation of the hydraulic machine to be restarted simply.

(20) In the above (19), preferably, the burglarproof device of the present invention further comprises automatic lock input means operated by an operator for instructing whether automatic lock is to be set or not, and the unlocking electronic circuit further comprises third unlocking control means which sets the lock or unlock state by the first unlocking control means and brings the unlocking electronic circuit down when the key switch is turned off in a condition where the automatic lock input means does not instruct setting of the automatic lock, and which always sets the lock state and brings the unlocking electronic circuit down when the key switch is turned off in a condition where the automatic lock input means instruct setting of the automatic lock.

By so providing the automatic lock means and the third unlocking control means, if the automatic lock means is operated to instruct setting of the automatic lock, an automatic lock mode is set in which when the operator turns off the key switch upon the operation of the hydraulic machine being stopped, the third unlocking control means always sets the lock state and brings the system down regardless of the state of the lock input means, and when the operator turns on the key switch at the subsequent start-up of the hydraulic machine, the second unlocking control means generates the unlock signal only when the predetermined code is entered, thereby enabling the hydraulic system to operate as per in the ordinary lock arrangement.

On the contrary, if the automatic lock means is not operated to instruct setting of the automatic lock, a manual lock mode is set in which when the operator turns off the key switch upon the operation of the hydraulic machine being stopped, the first unlocking control means is operated to set the lock or unlock state depending on the state of the lock input means, and only when the lock input means is operated to instruct setting of the lock state, the hydraulic machine can be operated upon the predetermined code being entered.

Accordingly, when the hydraulic machine is employed in the work field where its operation is frequently started up and stopped, the system can be brought down while the lock or unlock state is set depending the state of the lock input means, as stated above, by not instructing setting of the automatic lock from the automatic lock means to set the manual lock mode. On the other hand, in the case of not requiring the changeover between the lock state and unlock state with the lock input means in the manual mode, or for the operator who tends to forget to set the lock state with the lock input means in the manual mode, it is possible to set the lock state automatically as per in the ordinary lock arrangement when the key switch is turns off, by holding the automatic lock input means operated to instruct setting of the automatic lock at all times so as to set the automatic lock mode.

DETAILED DESCRIPTION OF THE PREFERRED EMBODIMENTS

Preferred embodiments of the present invention will be hereinafter described with reference to the drawings.

A first embodiment of the present invention will be described with reference to FIGS. 1 to 3.

Figure 1:
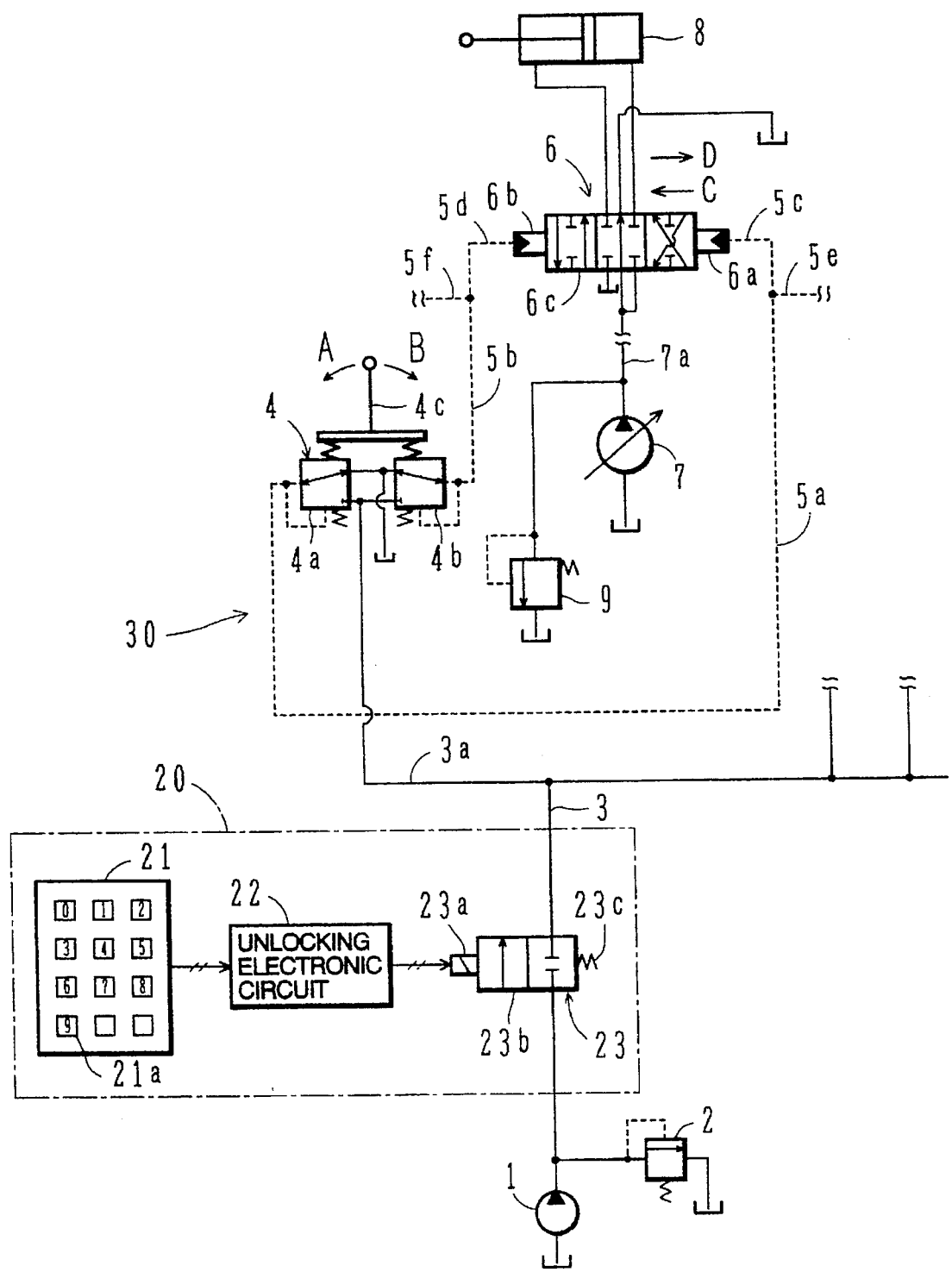
FIG. 1 is a diagram showing main part of a hydraulic circuit of a hydraulic machine equipped with a burglarproof device according to a first embodiment of the present invention.

In FIG. 1, a hydraulic machine equipped with a burglarproof device of this embodiment comprises a pilot hydraulic pump 1 for producing a pilot primary pressure, a pilot relief valve 2 connected to a delivery line of the pilot hydraulic pump 1 for keeping the pilot primary pressure constant, and a valve operating circuit 30 for operating a main control valve 6 with the pilot primary pressure produced by the pilot hydraulic pump 1. The valve operating circuit 30 comprises pilot primary pressure lines 3, 3a for transmitting the pilot primary pressure produced by the pilot hydraulic pump 1 therethrough, a pilot valve device 4 connected to the pilot primary pressure line 3a for converting the pilot primary pressure into pilot secondary pressures, and pilot secondary pressure lines 5a, 5c; 5b, 5d connected to the pilot valve device 4 for transmitting the pilot secondary pressures to the main control valve 6. The main control valve 6 is located between a main hydraulic pump 7 and a hydraulic cylinder 8 to change the flow path of a hydraulic fluid supplied from the main hydraulic pump 7 to the hydraulic cylinder 8. A main relief valve 9 is connected to a hydraulic fluid supply line 7a of the main hydraulic pump 7 for restricting a maximum pressure of the main hydraulic pump 7.

The pilot valve device 4 comprises a pair of pressure reducing valves 4a, 4b and a manual lever 4c for operating the pair of pressure reducing valves 4a, 4b. The main control valve 6 comprises hydraulic driving sectors 6a, 6b connected respectively to the pilot secondary pressure lines 5a, 5c; 5b, 5d, and a spool 6c driven by the hydraulic driving sectors 6a, 6b for changing the fluid path between the main hydraulic pump 7 and the hydraulic cylinder 8.

The pilot primary pressure produced by the pilot hydraulic pump 1 and kept constant by the pilot relief valve 2 is introduced to the pressure reducing valves 4a, 4b through the pilot primary pressure lines 3, 3a. When the manual lever 4c is tilted down by an operator in the direction of arrow A, for example, the pressure reducing valve 4a is operated and the pilot secondary pressure corresponding to the stroke of the manual lever 4c is introduced to the hydraulic driving sector 6a through the pilot secondary pressure lines 5a, 5c, whereupon the spool 6c of the main control valve 6 moves in the direction of arrow C. The movement of the spool 6c allows the hydraulic fluid from the main hydraulic pump 7 to be introduced to the bottom side of the hydraulic cylinder 8 so that a cylinder rod is extended and working equipment (described later) mounted to the cylinder rod is moved for operation of the hydraulic machine. Conversely, when the manual lever 4c is tilted down in the direction of arrow B, the pressure reducing valve 4b is operated and the pilot secondary pressure corresponding to the stroke of the manual lever 4c is introduced to the hydraulic driving sector 6b through the pilot secondary pressure lines 5b, 5d, whereupon the spool 6c of the main control valve 6 moves in the direction of arrow D. The movement of the spool 6c allows the hydraulic fluid from the main hydraulic pump 7 to be introduced to the rod side of the hydraulic cylinder 8 so that the cylinder rod is withdrawn and the working equipment mounted to the cylinder rod is moved in the opposite direction to the above case for operation of the hydraulic machine.

Figure 2:
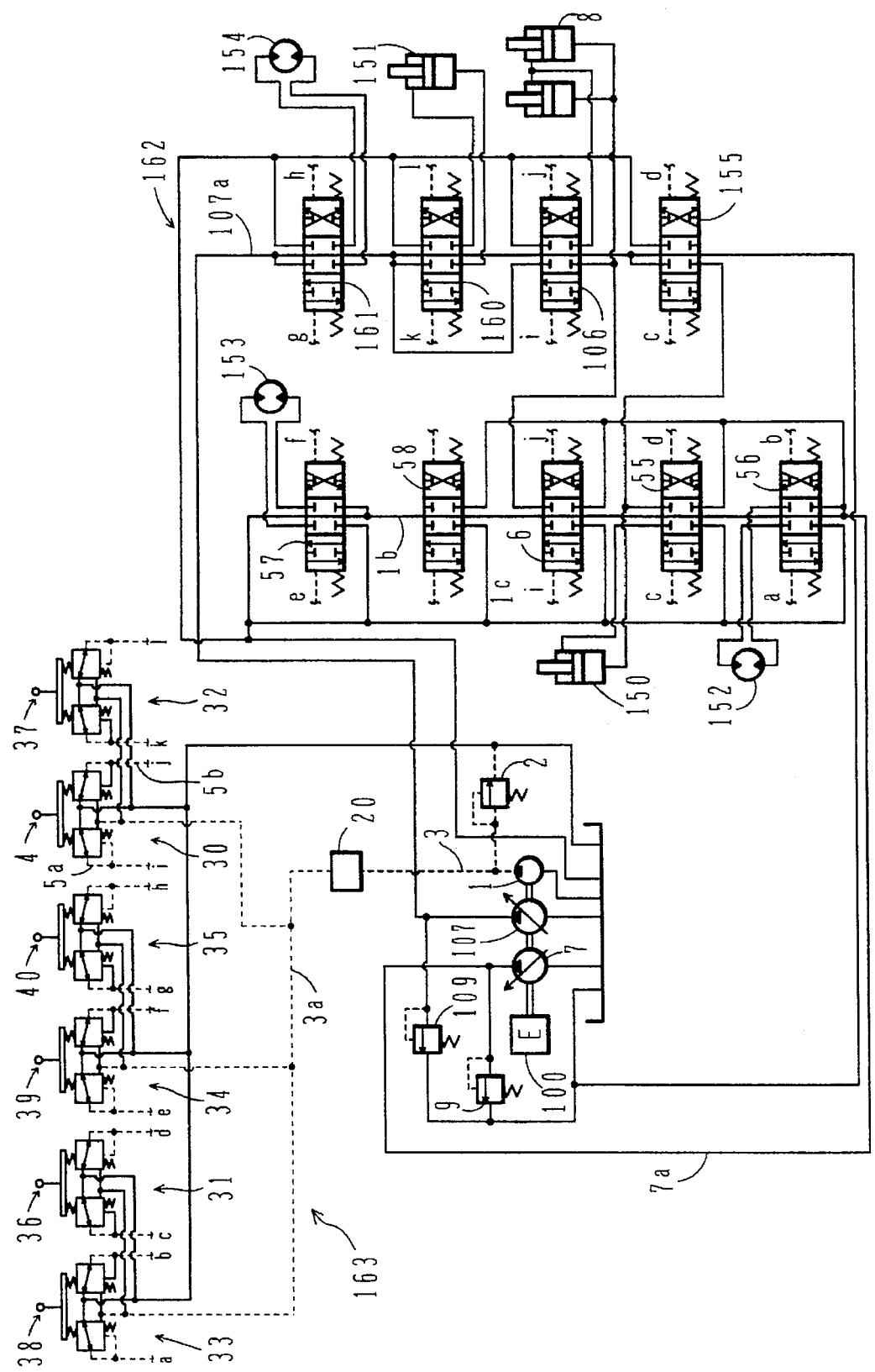
FIG. 2 is a diagram showing the whole of the hydraulic circuit shown in FIG. 1.

FIG. 2 shows the whole of a hydraulic system. In FIG. 2, the hydraulic machine on which the burglarproof device of this embodiment is mounted includes a hydraulic system consisted of a main hydraulic circuit 162 and a pilot hydraulic circuit 163.

The main hydraulic circuit 162 comprises the aforesaid main hydraulic pump 7 driven by an engine 100, another main hydraulic pump 107 driven by the engine 100, a plurality of actuators 8, 150 to 154, including the aforesaid actuator 8, which are driven by hydraulic fluids delivered from the main hydraulic pumps 7, 107, the aforesaid main control valve 6, other main control valves 55 to 57 and a reserve main control valve 58 for controlling flow rates of the hydraulic fluid supplied from the main hydraulic pump 7 to the plurality of actuators 8, 150, 152, 153, and main control valves 106, 155, 160, 161 for controlling flow rates of the hydraulic fluid supplied from the main hydraulic pump 107 to the plurality of actuators 8, 150, 151, 154. Incidentally, 109 is a main relief valve for the main hydraulic pump 107 and 107a is a hydraulic fluid supply line of the main hydraulic pump 107.

The pilot hydraulic circuit 163 comprises the aforesaid pilot hydraulic pump 1 driven by the engine 100, the aforesaid pilot relief valve 2, the aforesaid valve operating circuit 30 for operating the main control valves 6, 106 in the main hydraulic circuit 162 with the pilot primary pressure produced by the pilot hydraulic pump 1, and valve operating circuits 31 to 35 for similarly operating the main control valves 55, 155; 56; 57; 160; 161 in the main hydraulic circuit 162 with the pilot primary pressure produced by the pilot hydraulic pump 1.

The aforesaid valve operating circuits 31 to 35 are each of essentially the same structure as the valve operating circuit 30, and include respective pilot valve devices 36 to 40 which are each similar to the pilot valve device 4.

Connections between the pilot valve devices and the main control valves are indicated by alphabets a, b; c, d; e, f; g, h; i, j; k, l. The pilot valve device 4 is connected to not only the main control valve 6, but also the main control valve 106 through the pilot secondary pressure lines 5a, 5e; 5b, 5f so that the hydraulic fluids delivered from the main hydraulic pumps 7, 107 are joined together and supplied to the actuator 8 upon operation of the pilot valve device 4. Likewise, the pilot valve device 36 is connected to both the main control valves 55, 155 so that the hydraulic fluids delivered from the main hydraulic pumps 7, 107 are joined together and supplied to the actuator 150 upon operation of the pilot valve device 36.

Figure 3:
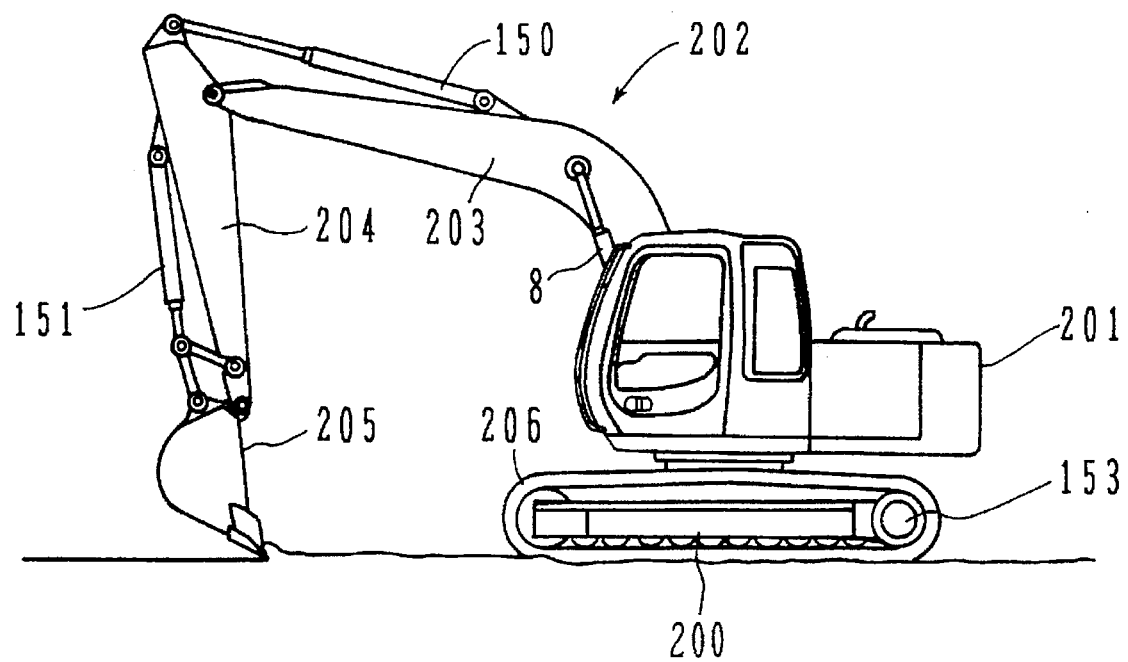
FIG. 3 is a view showing a hydraulic excavator as a typical example of hydraulic machines on which the burglarproof device is to be mounted.

FIG. 3 shows an appearance of the hydraulic machine. In this embodiment, the hydraulic machine is a hydraulic excavator which has an undercarriage 200, an upper structure 201, and a front attachment 202 as working equipment. The front attachment 202 comprises a boom 203, an arm 204 and a bucket 205 which are interconnected in a relatively vertically movable manner. The undercarriage 200 has a pair of left and right crawlers 206 (only one of which is shown) driven by the aforesaid actuators (track motors) 153, 154. The aforesaid actuator (swing motor) 152 is incorporated in the upper structure 201 so that the upper structure 201 is driven to swing with respect to the undercarriage 200. Further, the boom 203, the arm 204 and the bucket 205 are driven respectively by the actuator (boom cylinder) 8, the actuator (arm cylinder) 150, and the actuator (bucket cylinder) 151 so as to rotate in the vertical direction.

Returning to FIG. 1, the burglarproof device 20 of this embodiment is provided in the hydraulic machine constructed as explained above.

The burglarproof device 20 comprises a key input unit 21 as code input means which has a plurality of keys including ten numeral keys 21a from 0 to 9, an unlocking electronic circuit 22 for generating an ON electric signal as an unlock signal when the ten numeral keys 21a of the key input unit 21 are depressed in the order of the password and a predetermined code corresponding to the password is entered, and a solenoid valve 23 provided as lock means in one 3a of the pilot primary pressure lines 3, 3a between the pilot hydraulic pump 1 and the pilot valve device 4 which is common to the plurality of valve operating circuits 30 to 35.

The solenoid valve 23 is an on/off valve comprising a solenoid driving sector 23a electrically connected to the unlocking electronic circuit 22 and a spool 23b driven by the solenoid driving sector 23a. When the unlock signal (the ON electric signal) is not generated from the unlocking electronic circuit 22, the spool 23b is held in its closed position by the force of a spring 23c as shown. When the unlock signal is generated from the unlocking electronic circuit 22, i.e., when the electric signal turns ON, the solenoid driving sector 23a is actuated to shift the spool 23b from the closed position as shown to an open position.

The key input unit 21 and the unlocking electronic circuit 22 receiving signals from the key input unit 21 are disposed in such a location as operable and accessible by the operator.

In the thus-constructed burglarproof device of this embodiment, when the operator depresses the ten numeral keys 21a of the key input unit 21 in the order of the password, the password (predetermined code) is input to the unlocking electronic circuit 22, whereupon the unlocking electronic circuit 22 outputs the unlock signal (the ON electric signal) to the solenoid driving sector 23a of the solenoid valve 23 for energizing it. The spool 23b of the solenoid valve 23 is thereby shifted to the open position so that the pilot primary pressure line 3 is brought into a connected state. Therefore, the pilot primary pressure from the pilot hydraulic pump 1 is not shut off and, upon operation of the manual lever 4c of the pilot valve device 4, the pilot secondary pressure is produced to move the main control valve 6, causing the hydraulic fluid to be supplied from the main hydraulic pump 7 to the boom cylinder 8, as described above. Simultaneously, the main control valve 106 shown in FIG. 2 is also moved, allowing the hydraulic fluid to be supplied from the main hydraulic pump 107 to the boom cylinder 8. As a result, the boom cylinder 8 is driven to move the boom 203. When the other pilot valve devices 36–40 shown in FIG. 2 are operated, the corresponding actuators 150–154 are driven to move the respective working equipment elements, such as the arm 204 and the bucket 205, in a like manner.

To the contrary, when the ten numeral keys 21a of the key input unit 21 are not depressed in the order of the password, no predetermined code is input to the unlocking electronic circuit 22 which then does not output the unlock signal, and the solenoid valve 23 keeps the pilot primary pressure line 3 in a cutoff state. Therefore, the pilot primary pressure from the pilot hydraulic pump 1 is shut off and, even upon operation of the manual lever 4c of the pilot valve device 4, the pilot secondary pressure is not produced and both the main control valves 6, 106 are kept standstill. As a result, the boom cylinder 8 is not driven and the boom 203 is unable to move. Likewise, even if any other pilot valve device, e.g., the pilot valve devices 39, 40 for running, the track motors 153, 154 are not driven and the crawlers 206 of the undercarriage 200 are unable to move.

According to this embodiment, therefore, any persons who do not know the password of the key input unit 21 cannot move the hydraulic machine, and the hydraulic machine can be protected against burglary.

Also, according to this embodiment, since the unlock signal generated from the unlocking electronic circuit 22 is provided as an ON electric signal and the solenoid valve 23 keeps the pilot primary pressure line 3 cut off when the ON electric signal is not generated, the pilot primary pressure line 3 can be maintained in the cutoff state even if the burglar notices the presence of the burglarproof device 20 and destroys the parts which are easily findable, such as the key input unit 21, the unlocking electronic circuit 22 and so on. Hence, the hydraulic machine can move in no way and can be surely protected against burglary.

Further, since the solenoid valve 23 cuts off the hydraulic system, there is no need of taking safety measures against fuel leakage. Also, since the solenoid valve 23 is a small part and may be installed in any suitable location along the pilot primary pressure line 3 which is extended long on the machine, the solenoid valve 23 can be provided in a position where it is hard to find for burglars. In addition, since the pressure of the pilot hydraulic circuit is as low as 10 Kg/cm², for example, and the pilot primary pressure line 3 has a thin pipe diameter, the installation of the solenoid valve 23 is easy.

Figure 4:
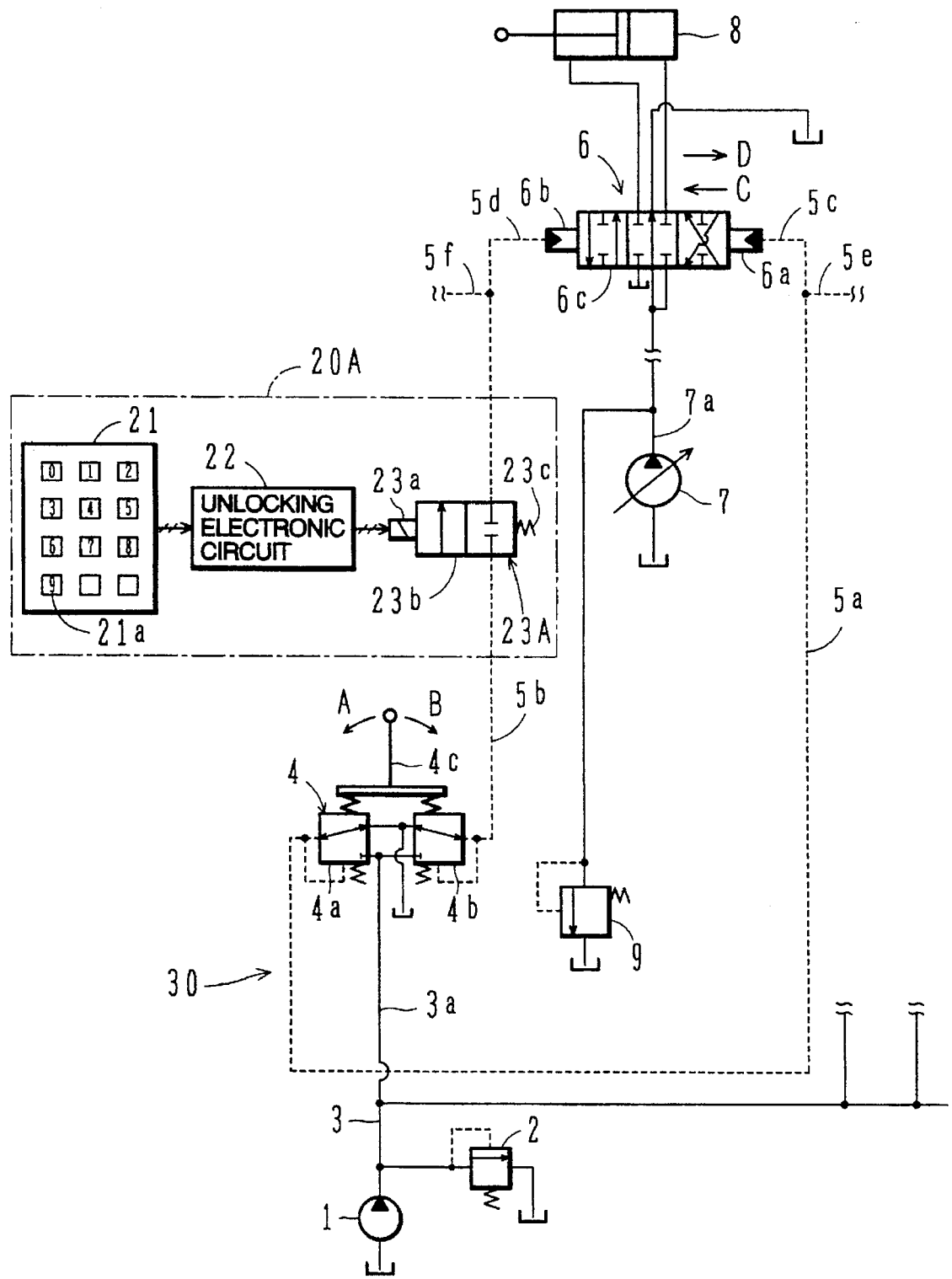
FIG. 4 is a diagram showing a hydraulic circuit of a hydraulic machine equipped with a burglarproof device according to a second embodiment of the present invention.

A second embodiment of the present invention will be described with reference to FIG. 4. In this embodiment, the lock means of the burglarproof device is provided on the pilot secondary pressure side of the valve operating circuit. In FIG. 4, the same or equivalent members as those in FIG. 1 are denoted by the same reference numerals.

Referring to FIG. 4, a burglarproof device 20A of this embodiment has a solenoid valve 23A installed in the common pilot secondary pressure line 5b between the pilot valve device 4 and the main control valves 6, 106 (see FIG. 2). The remaining arrangement is the same as in the first embodiment.

In the thus-constructed burglarproof device of this embodiment, when the operator depresses the ten numeral keys 21a of the key input unit 21 in the order of the password, the predetermined code is input to the unlocking electronic circuit 22, whereupon the unlocking electronic circuit 22 outputs the unlock signal (the ON electric signal) to the solenoid driving sector 23a of the solenoid valve 23A for energizing it. The spool 23b of the solenoid valve 23A is thereby shifted to the open position so that the pilot secondary pressure line 5b is brought into a connected state. Therefore, the pilot secondary pressure from the pilot valve device 4 is not shut off and, upon the manual lever 4c of the pilot valve device 4 being operated in the direction B, the pilot secondary pressure is transmitted to the hydraulic driving sector 6b of the main control valve 6 to move the main control valve 6, causing the hydraulic fluid to be supplied from the main hydraulic pump 7 to the bottom side of the boom cylinder 8. Simultaneously, the main control valve 106 shown in FIG. 2 is also moved, allowing the hydraulic fluid to be supplied from the main hydraulic pump 107 to the bottom side of the boom cylinder 8. As a result, the boom cylinder 8 is driven in the direction to extend so that the boom 203 can be moved upwardly.

To the contrary, when the ten numeral keys 21a of the key input unit 21 are not depressed in the order of the password, no predetermined code is input to the unlocking electronic circuit 22 which then does not output the unlock signal, and the solenoid valve 23A keeps the pilot secondary pressure line 5b in a cutoff state. Therefore, the pilot secondary pressure from the pilot valve device 4 is shut off and, even upon the manual lever 4c of the pilot valve device 4 being operated in the direction B, both the main control valves 6, 106 (see FIG. 2) are held standstill. As a result, the boom cylinder 8 is not driven in the direction to extend, disabling the upward movement of the boom 203. In other words, the front attachment 202 is maintained in a condition where the bucket 205 is held in contact with the ground as shown in FIG. 3, and hence the hydraulic machine can be prevented from moving.

By so shutting off the pilot secondary pressure, it is also possible to keep the hydraulic machine standstill unless the ten numeral keys 21a of the key input unit 21 are depressed in the order of the password, and to protect it against burglary.

Consequently, this embodiment can also provide the similar advantages as with the first embodiment.

While the pilot secondary pressure on the boom-up side of the valve operating circuit 30 for the boom is shut off in the above-explained embodiment, the pilot secondary pressure at least on the forward run side of at least one of the valve operating circuits 34, 35 for running may be shut off. Also in such a case, the hydraulic machine is unable to move unless the ten numeral keys 21a of the key input unit 21 are depressed in the order of the password, and can be protected against burglary. As an alternative, the invention may be applied to the other valve operating circuits for the arm and the bucket, although a degree of the security against burglary is reduced.

Additionally, desired one of whether the pilot primary pressure or the pilot secondary pressure is to be shut off may be employed from such layout points of view as which one of the pilot primary pressure line 3 and the pilot secondary pressure line 5a, 5b allows the solenoid valve to be more easily attached thereto or attached to a location where the valve is less susceptible to the finding by burglars, depending on individual hydraulic machines.

Figure 5:
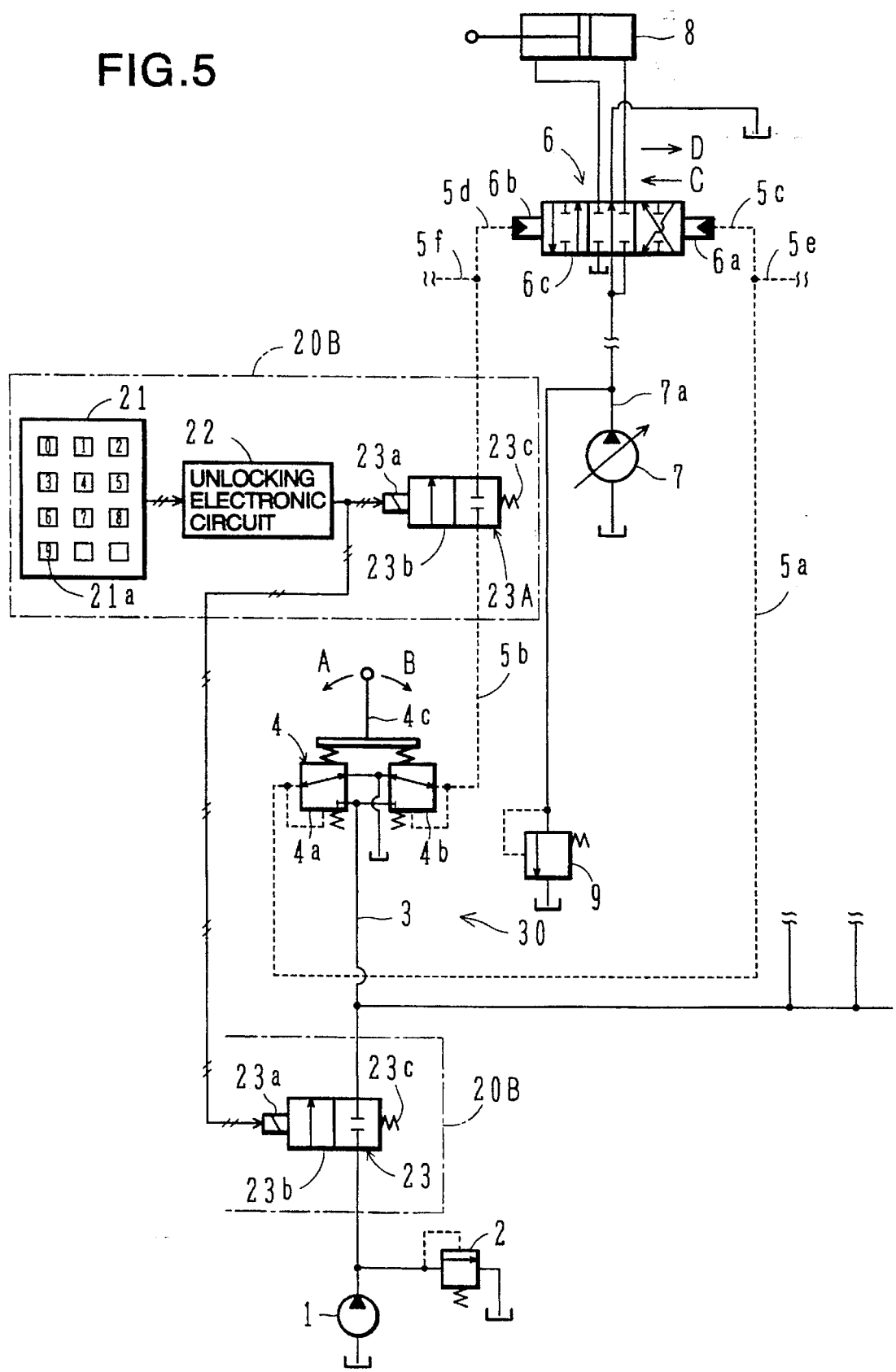
FIG. 5 is a diagram showing a hydraulic circuit of a hydraulic machine equipped with a burglarproof device according to a third embodiment of the present invention.

A third embodiment of the present invention will be described with reference to FIG. 5. In this embodiment, the lock means of the burglarproof device is provided double. In FIG. 5, the same or equivalent members as those in FIGS. 1 and 4 are denoted by the same reference numerals.

Referring to FIG. 5, a burglarproof device 20B of this embodiment has two solenoid valves, i.e., the solenoid valve 23 installed in the pilot primary pressure line 3 which is common to the plurality of valve operating circuits 30 to 35 (see FIG. 2), and the solenoid valve 23A installed in the pilot secondary pressure line 5b between the pilot valve device 4 and the main control valves 6, 106 (see FIG. 2). The unlocking electronic circuit 22 outputs the unlock signal to both the solenoid valves 23, 23A. The remaining arrangement is the same as in the first embodiment.

In the thus-constructed burglarproof device of this embodiment, even if the burglar finds one of the solenoid valves 23, 23A and connects the lines between the inlet and outlet sides of the found solenoid valve to each other, the other undiscovered solenoid valve still functions normally and the hydraulic machine can be protected against burglary.

Consequently, this embodiment can further improve a degree of the security against burglary.

While the solenoid valve as the lock means is provided in two locations in the above-explained embodiment, it may be in three or more locations as needed.

Figure 6:
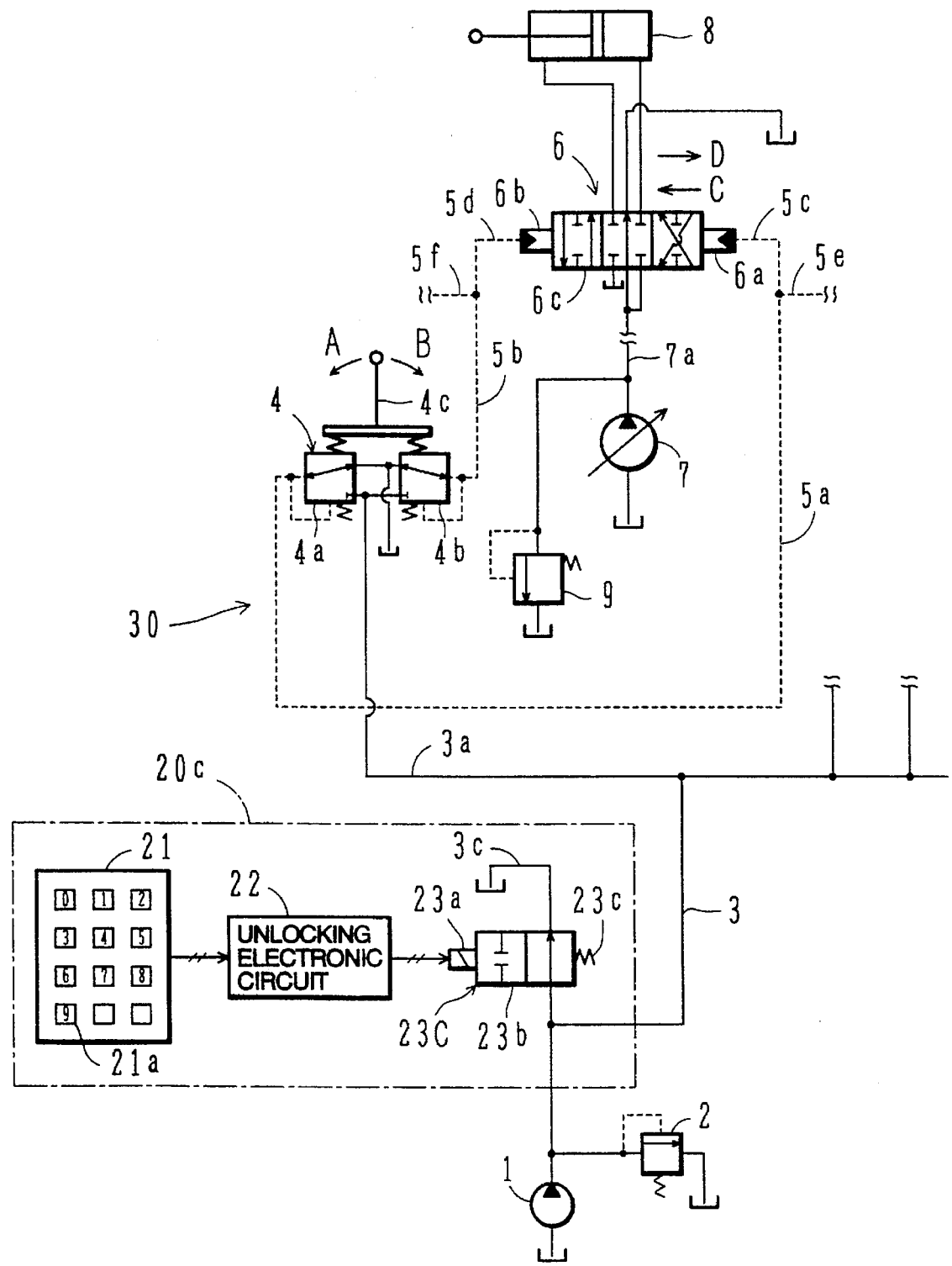
FIG. 6 is a diagram showing a hydraulic circuit of a hydraulic machine equipped with a burglarproof device according to a fourth embodiment of the present invention.

A fourth embodiment of the present invention will be described with reference to FIG. 6. This embodiment represents an example of the lock means which does not shut off the pilot pressure, but disables the operation of the hydraulic system. In FIG. 6, the same or equivalent members as those in FIG. 1 are denoted by the same reference numerals.

Referring to FIG. 6, a burglarproof device 20C of this embodiment has, as the lock means, a solenoid valve 23C disposed in a branch line 3c through which the pilot primary pressure line 3 is communicated with a reservoir. The solenoid valve 23C is held in an open position as shown when the unlocking electronic circuit 22 does not generate the unlock signal (the ON electric signal), and is shifted from the open position as shown to a closed position when the unlocking electronic circuit 22 generates the unlock signal, i.e., the electric signal turns ON, and the solenoid driving sector 23a is actuated. The remaining arrangement is the same as in the first embodiment.

In the thus-constructed burglarproof device of this embodiment, when the unlock signal is not generated from the unlocking electronic circuit 22, the solenoid valve 23C is held in the open position as shown so that the pilot primary pressure line 3 is communicated with the reservoir and the pilot primary pressure is released to the reservoir. Even with the pilot valve device 4 operated, therefore, the main control valve 6 is kept standstill. As a result, the hydraulic machine can be protected against burglary.

On the other hand, when the unlock signal is generated from the unlocking electronic circuit 22, the solenoid valve 23C is closed to disconnect the pilot primary pressure line 3 from the reservoir, whereupon the pilot primary pressure is established, enabling the actuator 8 to be operated with the pilot valve device 4.

Consequently, this embodiment can also provide the similar advantages as with the first embodiment.

Figure 7:
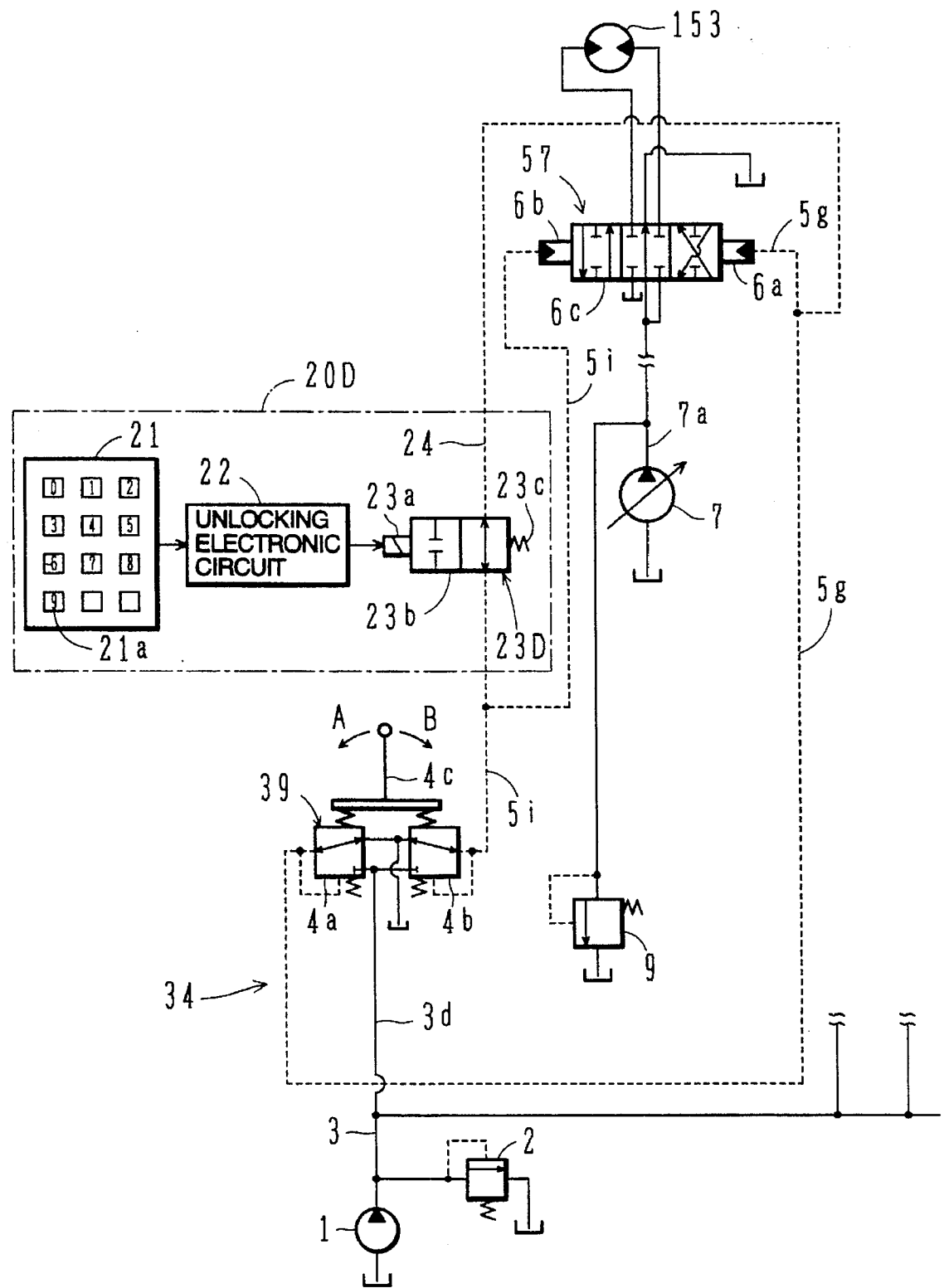
FIG. 7 is a diagram showing a hydraulic circuit of a hydraulic machine equipped with a burglarproof device according to a fifth embodiment of the present invention.

A fifth embodiment of the present invention will be described with reference to FIG. 7. This embodiment represents another example of the lock means which does not shut off the pilot pressure, but disables the operation of the hydraulic system. In FIG. 7, the same or equivalent members as those in FIG. 1 are denoted by the same reference numerals.

Referring to FIG. 7, a burglarproof device 20D of this embodiment has a line 24 connecting the pilot secondary pressure line 5g on the forward run side and the pilot secondary pressure line 5i on the backward run side of the valve operating circuit 34 for running, and a solenoid valve 23D disposed in the line 24. The solenoid valve 23D is held in an open position as shown when the unlocking electronic circuit 22 does not generate the unlock signal (the ON electric signal), and is shifted from the open position as shown-to a closed position when the unlocking electronic circuit 22 generates the unlock signal, i.e., the electric signal turns ON, and the solenoid driving sector 23a is actuated. The remaining arrangement is the same as in the first embodiment.

In the thus-constructed burglarproof device of this embodiment, when the unlock signal is not generated from the unlocking electronic circuit 22, the solenoid valve 23D is held in the open position as shown so that the pilot secondary pressure line 5g on the forward run side and the pilot secondary pressure line 5i on the backward run side are communicated with each other. Even with the pilot valve device 4 operated, therefore, the main control valve 6 is kept standstill. As a result, the track motor 153 is unable to rotate and the hydraulic machine can be protected against burglary.

On the other hand, when the unlock signal is generated from the unlocking electronic circuit 22, the solenoid valve 23D is closed to cut off the communication between the pilot secondary pressure lines 5g and 5i, enabling the hydraulic machine to be operated in a normal manner with the pilot valve device 4.

Consequently, this embodiment can also provide the similar advantages as with the first embodiment.

While the invention is applied to the valve operating circuit 34 for one track motor 153 to disable the running of the hydraulic machine in the above-explained embodiment, it may be applied to the valve operating circuit 35 for the other track motor 154. Also, as with the first embodiment, the invention may be applied to the valve operating circuit 30 for the boom. As an alternative, the invention may be applied to the other valve operating circuits for the arm and the bucket, although a degree of the security against burglary is reduced.

Figure 8:
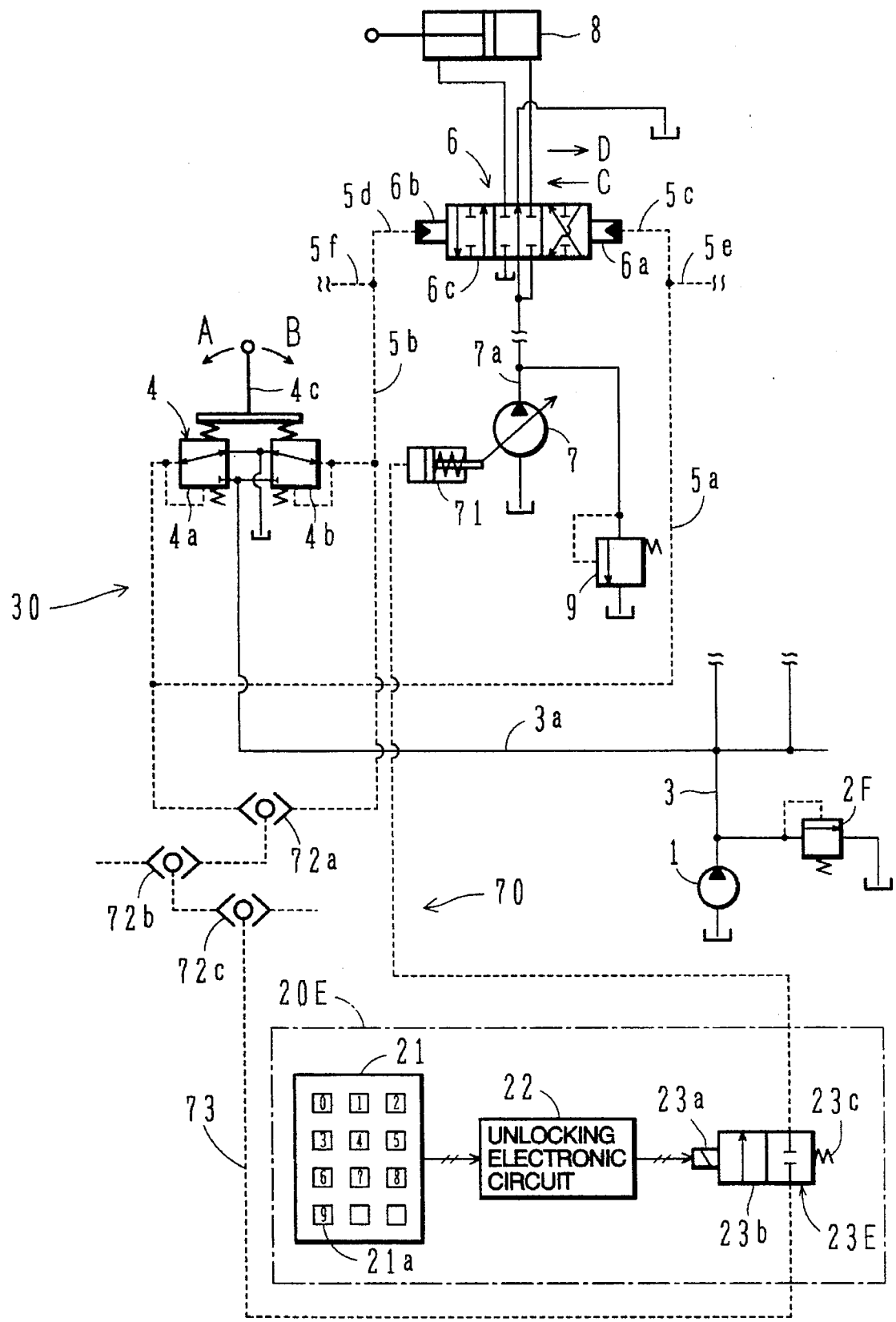
FIG. 8 is a diagram showing a hydraulic circuit of a hydraulic machine equipped with a burglarproof device according to a sixth embodiment of the present invention.

A sixth embodiment of the present invention will be described with reference to FIG. 8. In this embodiment, the invention is applied to any other portion of the pilot hydraulic circuit than the valve operating circuit. In FIG. 8, the same or equivalent members as those in FIG. 1 are denoted by the same reference numerals.

Referring to FIG. 8, the main hydraulic pump 7 is a variable displacement pump of which delivery flow rate is controlled by a pump control circuit 70 including an actuator 71 which drives a swash plate of the main hydraulic pump 7. The pump control circuit 70 comprises a shuttle valve 72a connected to the pilot secondary pressure lines 5a, 5b of the valve operating circuit 30 for detecting higher one of the two pilot secondary pressures, similar shuttle valves (not shown) connected to the pilot secondary pressure lines of the other valve operating circuits 31 to 35 (see FIG. 2), shuttle valves 72b, 72c, etc. connected to those shuttle valves 72a, . . . for detecting maximum one of the pilot secondary pressures of the valve operating circuits 31 to 35, and a control line 73 for introducing the maximum pilot secondary pressure detected by those shuttle valves, as a control pressure, to the actuator 71. The actuator 71 operates to increase the amount of tilting of the pump as the control pressure introduced to it rises, thereby increasing the pump delivery rate. Accordingly, the delivery rate of the main hydraulic pump 7 is subjected to positive control such that it increases corresponding to the magnitude of the pilot secondary pressure (i.e., the flow rate demanded).

A burglarproof device 20E of this embodiment is disposed in the above pump control circuit 70 and has a solenoid valve 23E disposed in the control line 73. The remaining arrangement is the same as in the first embodiment.

In the thus-constructed burglarproof device of this embodiment, when the unlock signal is not generated from the unlocking electronic circuit 22, the solenoid valve 23E is held in a closed position to cut off the control line 73. Therefore, even with, for example, the pilot valve device 4 operated, the actuator 71 is not operated and the delivery rate of the main hydraulic pump 7 is not increased. As a result, the hydraulic machine can be protected against burglary.

On the other hand, when the unlock signal is generated from the unlocking electronic circuit 22, the solenoid valve 23E is opened so that the maximum pilot secondary pressure detected by the shuttle valves 72a, 72b, 72c, etc. is introduced as a control pressure to the actuator 71. Therefore, the delivery rate of the main hydraulic pump 7 can be controlled in a normal manner.

Consequently, this embodiment can also provide the similar advantages as with the first embodiment.

Figure 9:
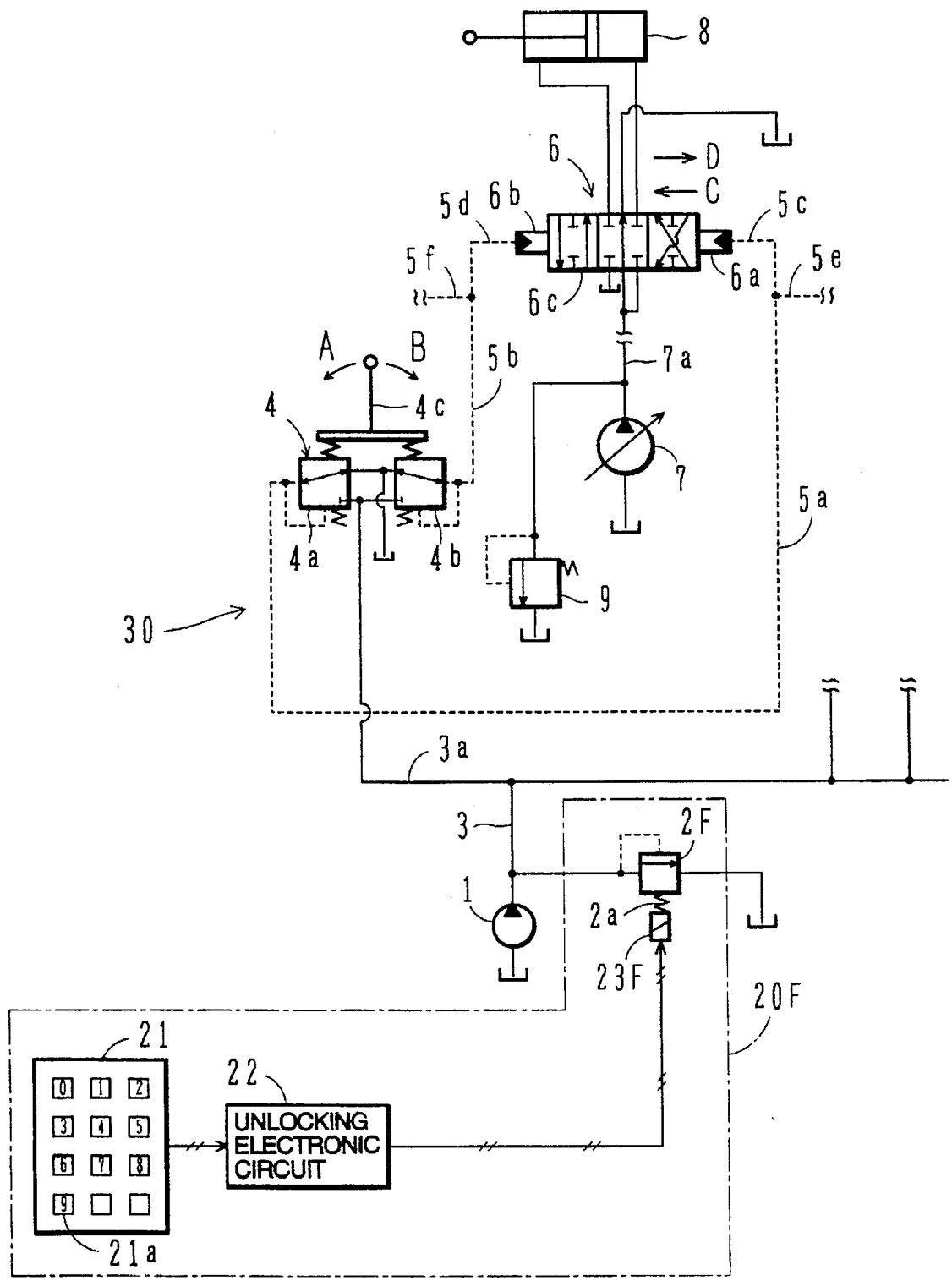
FIG. 9 is a diagram showing a hydraulic circuit of a hydraulic machine equipped with a burglarproof device according to a seventh embodiment of the present invention.

A seventh embodiment of the present invention will be described with reference to FIG. 9. Also in this embodiment, the invention is applied to any other portion of the pilot hydraulic circuit than the valve operating circuit. In FIG. 9, the same or equivalent members as those in FIG. 1 are denoted by the same reference numerals.

Referring to FIG. 9, a burglarproof device 20F of this embodiment includes a pilot relief valve 2F constituted as a variable relief valve. The pilot relief valve 2F has a relief pressure regulating solenoid 23F which makes the setting of a spring 2a (i.e., the relief setting pressure) zero (0) when not energized, and makes the setting of the spring 2a (i.e., the relief setting pressure) have a normal value when energized. The unlock signal from the unlocking electronic circuit 22 is output to the solenoid 23F. The remaining arrangement is the same as in the first embodiment.

In the thus-constructed burglarproof device of this embodiment, when the unlock signal is not generated from the unlocking electronic circuit 22, the solenoid 23F is not energized and the setting pressure of the pilot relief valve 2F becomes zero. Thereby, the hydraulic fluid from the pilot hydraulic pump 1 falls down into the reservoir and the pilot primary pressure is equal to the reservoir pressure. Therefore, the main control valve 6 is kept standstill even with the pilot valve device 4 operated, and the hydraulic machine can be protected against burglary.

On the other hand, when the unlock signal is generated from the unlocking electronic circuit 22, the solenoid 23F is energized and the setting pressure of the pilot relief valve 2F has a normal value. Therefore, the pilot primary pressure is established in a normal manner so that, for example, the actuator 8 can be operated with the pilot valve device 4.

Consequently, this embodiment can also provide the similar advantages as with the first embodiment.

Figure 10:
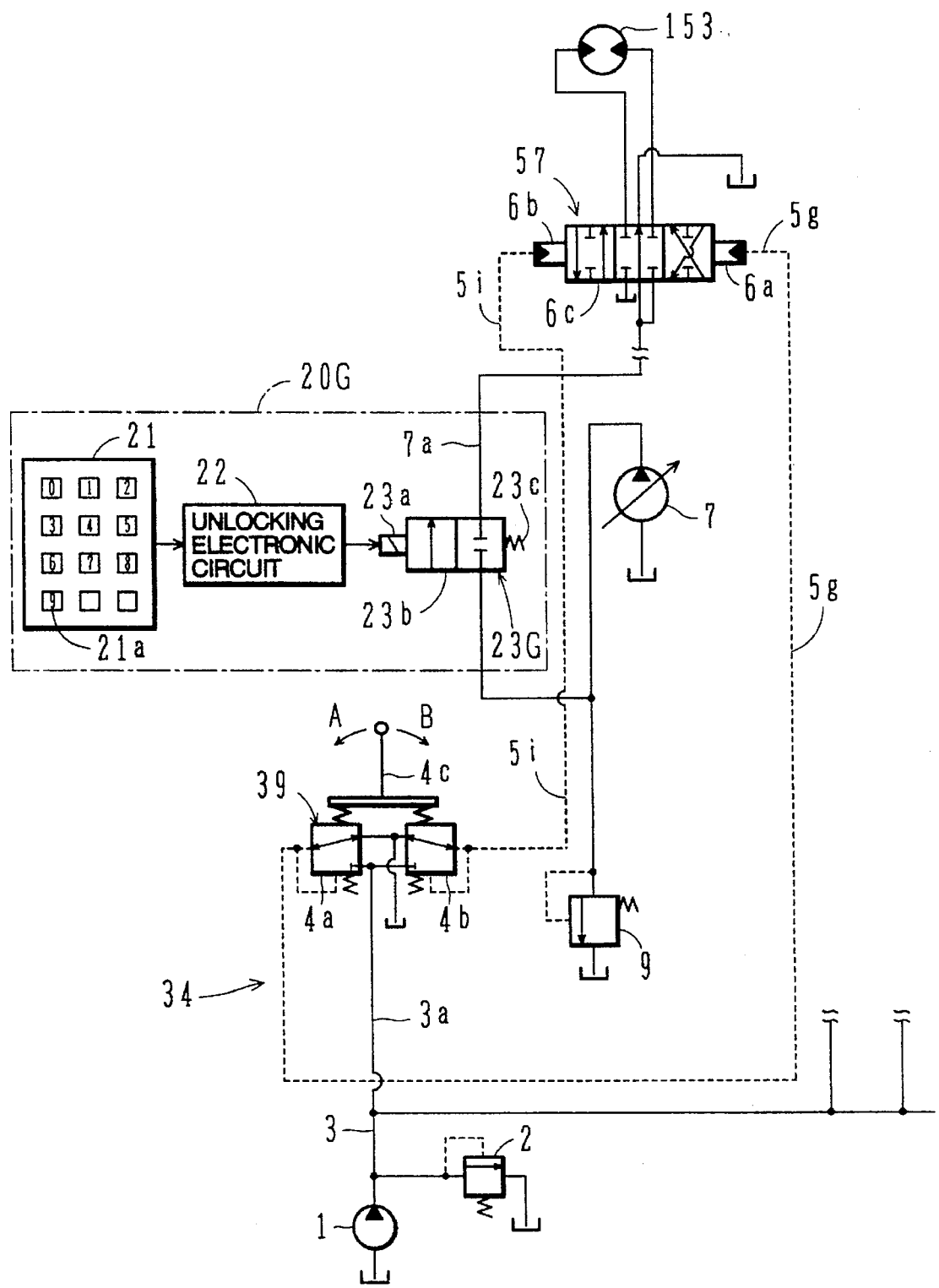
FIG. 10 is a diagram showing a hydraulic circuit of a hydraulic machine equipped with a burglarproof device according to an eighth embodiment of the present invention.

An eighth embodiment of the present invention will be described with reference to FIG. 10. In this embodiment, the invention is applied to not the pilot hydraulic circuit, but the main hydraulic circuit. In FIG. 10, the same or equivalent members as those in FIGS. 1 and 7 are denoted by the same reference numerals.

Referring to FIG. 10, a burglarproof device 20G of this embodiment includes a solenoid valve 23G disposed in the hydraulic fluid supply line 7a of the main hydraulic pump 7. The remaining arrangement is the same as in the first embodiment.

In the thus-constructed burglarproof device of this embodiment, when the unlock signal is not generated from the unlocking electronic circuit 22, the solenoid valve 23G is in a closed position as shown to cut off the hydraulic fluid supply line 7a. Therefore, even with, for example, the pilot valve device 39 operated, the track motor 153 is unable to rotate. As a result, the hydraulic machine can be protected against burglary.

On the other hand, when the unlock signal is generated from the unlocking electronic circuit 22, the solenoid valve 23G is opened, allowing the hydraulic fluid delivered from the main hydraulic pump 7 to be supplied to the respective actuators in a normal manner so that, for example, the track motor 153 can be operated with the pilot valve device 39.

Consequently, this embodiment can also provide the similar advantages as with the first embodiment.

While the solenoid valve 23G is directly installed in the hydraulic fluid supply line 7a in the above-explained embodiment, the arrangement may be modified such that the solenoid valve is constituted as an electro-hydraulic converting valve and a pilot operated valve shiftable with a pilot pressure delivered from the electro-hydraulic converting valve is installed in the hydraulic fluid supply line 7a. This enables the hydraulic fluid supply line 7a, through which the hydraulic fluid passes at a large flow rate under high pressure, to be selectively cut off and connected more easily.

Figure 11:
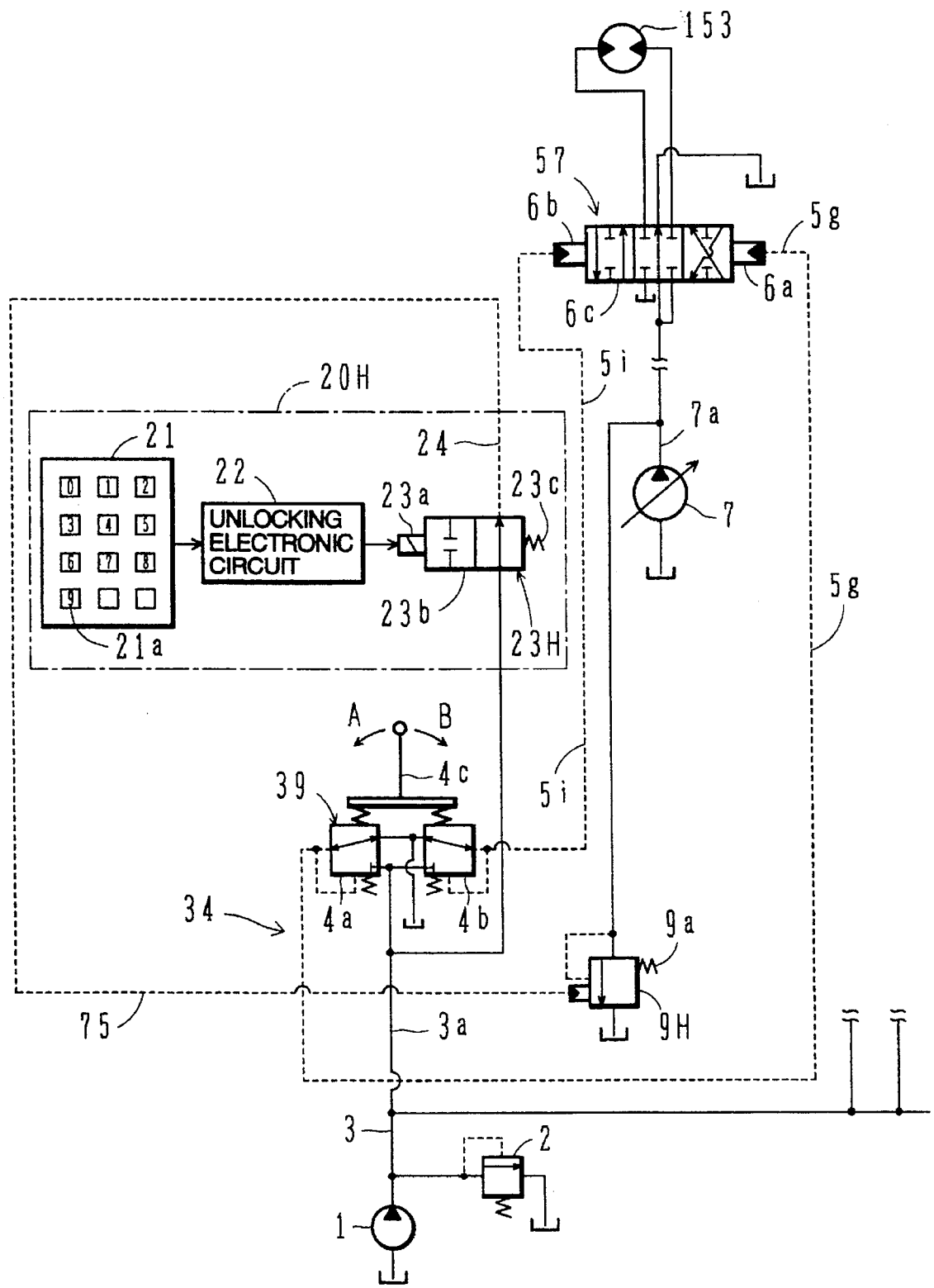
FIG. 11 is a diagram showing a hydraulic circuit of a hydraulic machine equipped with a burglarproof device according to a ninth embodiment of the present invention.

A ninth embodiment of the present invention will be described with reference to FIG. 11. In this embodiment, the invention is applied to an other portion of the main hydraulic circuit. In FIG. 11, the same or equivalent members as those in FIGS. 1 and 7 are denoted by the same reference numerals.

Referring to FIG. 11, a burglarproof device 20H of this embodiment includes a main relief valve 9H constituted as a variable relief valve. The main relief valve 9H has a relief pressure regulating hydraulic sector 9b which keeps the setting of a spring 9a (i.e., the relief setting pressure) to a normal value when no pilot pressure is introduced, and makes the setting of the spring 9a (i.e., the relief setting pressure) zero (0) when the pilot pressure is introduced. The burglarproof device 20H also includes a control line 75 for introducing the pilot primary pressure to the relief pressure regulating hydraulic sector 9b, and a solenoid valve 23H disposed in the control line 75. The solenoid valve 23H is held in an open position as shown when the unlocking electronic circuit 22 does not generate the unlock signal, and is shifted from the open position as shown to a closed position when the unlocking electronic circuit 22 generates the unlock signal. The remaining arrangement is the same as in the first embodiment.

In the thus-constructed burglarproof device of this embodiment, when the unlock signal is not generated from the unlocking electronic circuit 22, the solenoid valve 23H is held in the open position as shown and the pilot primary pressure is introduced to the relief pressure regulating hydraulic sector 9b. Thereby, the setting pressure of the main relief valve 9H becomes zero and the hydraulic fluid from the main hydraulic pump 7 falls down into the reservoir. Therefore, even with, for example, the pilot valve device 39 operated, the track motor 153 is unable to rotate. As a result, the hydraulic machine can be protected against burglary.

On the other hand, when the unlock signal is generated from the unlocking electronic circuit 22, the solenoid valve 23H is closed and the pilot primary pressure is not introduced to the relief pressure regulating hydraulic sector 9b, allowing the setting pressure of the main relief valve 9H to have a normal value. Therefore, the hydraulic fluid delivered from the main hydraulic pump 7 can be supplied to the respective actuators in a normal manner so that, for example, the track motor 153 can be operated with the pilot valve device 39.

Consequently, this embodiment can also provide the similar advantages as with the first embodiment.

Figure 12:
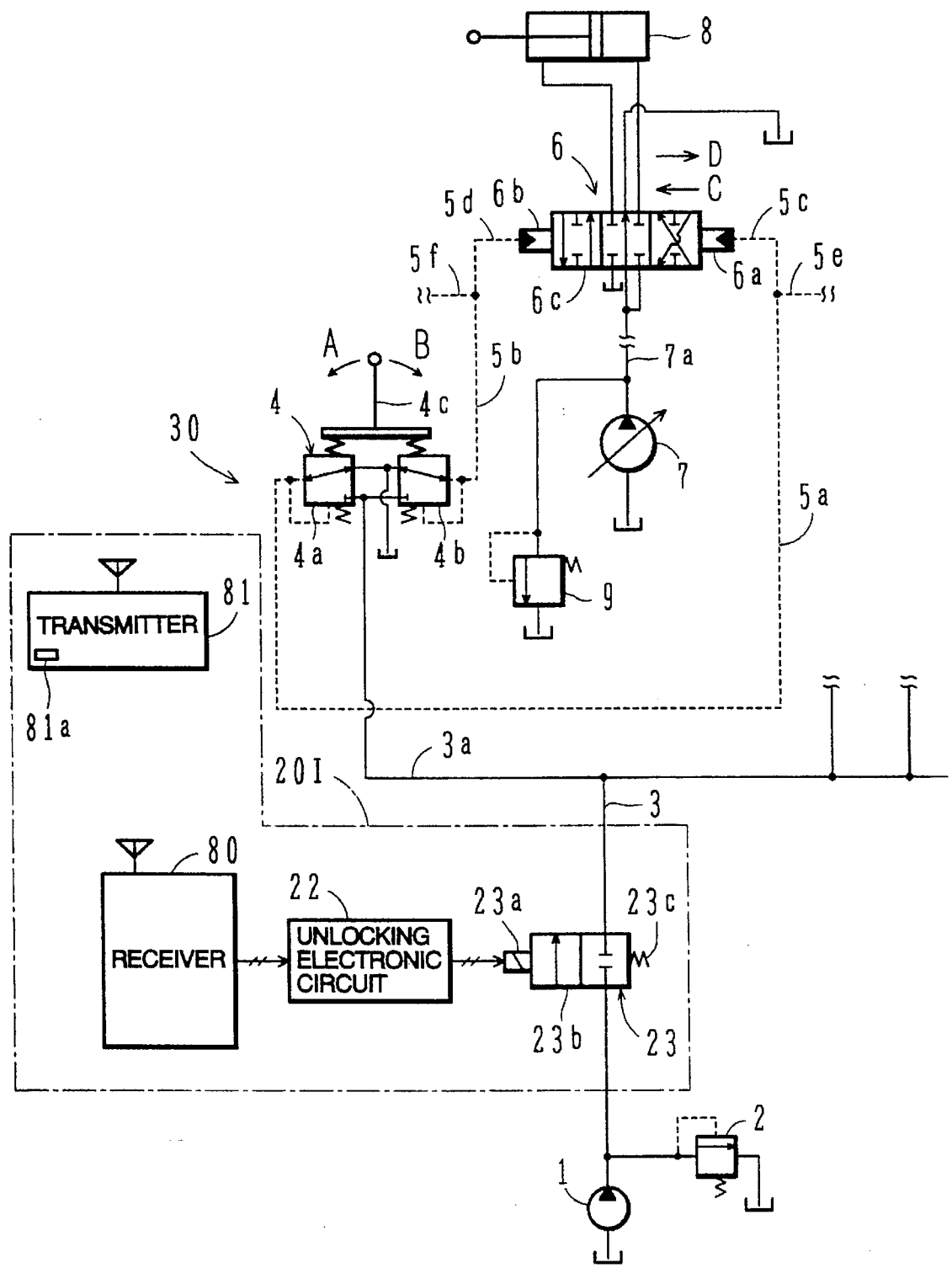
FIG. 12 is a diagram showing a hydraulic circuit of a hydraulic machine equipped with a burglarproof device according to a tenth embodiment of the present invention.

A tenth embodiment of the present invention will be described with reference to FIG. 12. This embodiment represents an example of the code input means other than the key input unit. In FIG. 12, the same or equivalent members as those in FIG. 1 are denoted by the same reference numerals.

Referring to FIG. 12, a burglarproof device 20I of this embodiment includes a wireless receiver 80 to which the password is input by radio, and a wireless transmitter 81 for transmitting the password to the wireless receiver 80 by radio. When the password is input to the receiver 80 by radio, the unlocking electronic circuit 22 generates the unlock signal. The transmitter 81 stores the password beforehand and then transmits the stored password to the receiver 80 by radio upon the operator depressing one button 81a thereon. The remaining arrangement is the same as in the first embodiment.

In the thus-constructed burglarproof device of this embodiment, when the button 81a on the transmitter 81 is not depressed and the password is not transmitted to the receiver 80, the unlock signal is not generated from the unlocking electronic circuit 22, the solenoid valve 23 is in the closed position as shown to cut off the pilot primary pressure line 3. Therefore, even with the pilot valve device 4 operated, the main control valve 6 is kept standstill. As a result, the hydraulic machine can be protected against burglary.

On the other hand, when the operator depresses the button 81a on the transmitter 81, the password is transmitted from the transmitter 81 and input to the receiver 80. Therefore, the unlock signal is generated from the unlocking electronic circuit 22 to open the solenoid valve 23 so that the actuator 8 can be operated with the pilot valve device 4.

Consequently, this embodiment can also provide the similar advantages as with the first embodiment.

Further, this embodiment is more convenient for the operator in that the operator is only required to carry the transmitter 81 storing the password therein beforehand with no need of fixing the password in mind. In addition, unlike the key input unit, the receiver is not required to be provided on the dashboard surface within a cab, but can be disposed in a place behind something. This means that the presence of the burglarproof device itself can be hidden. It is hence possible to further improve a degree of the security against burglary.

Figure 13:
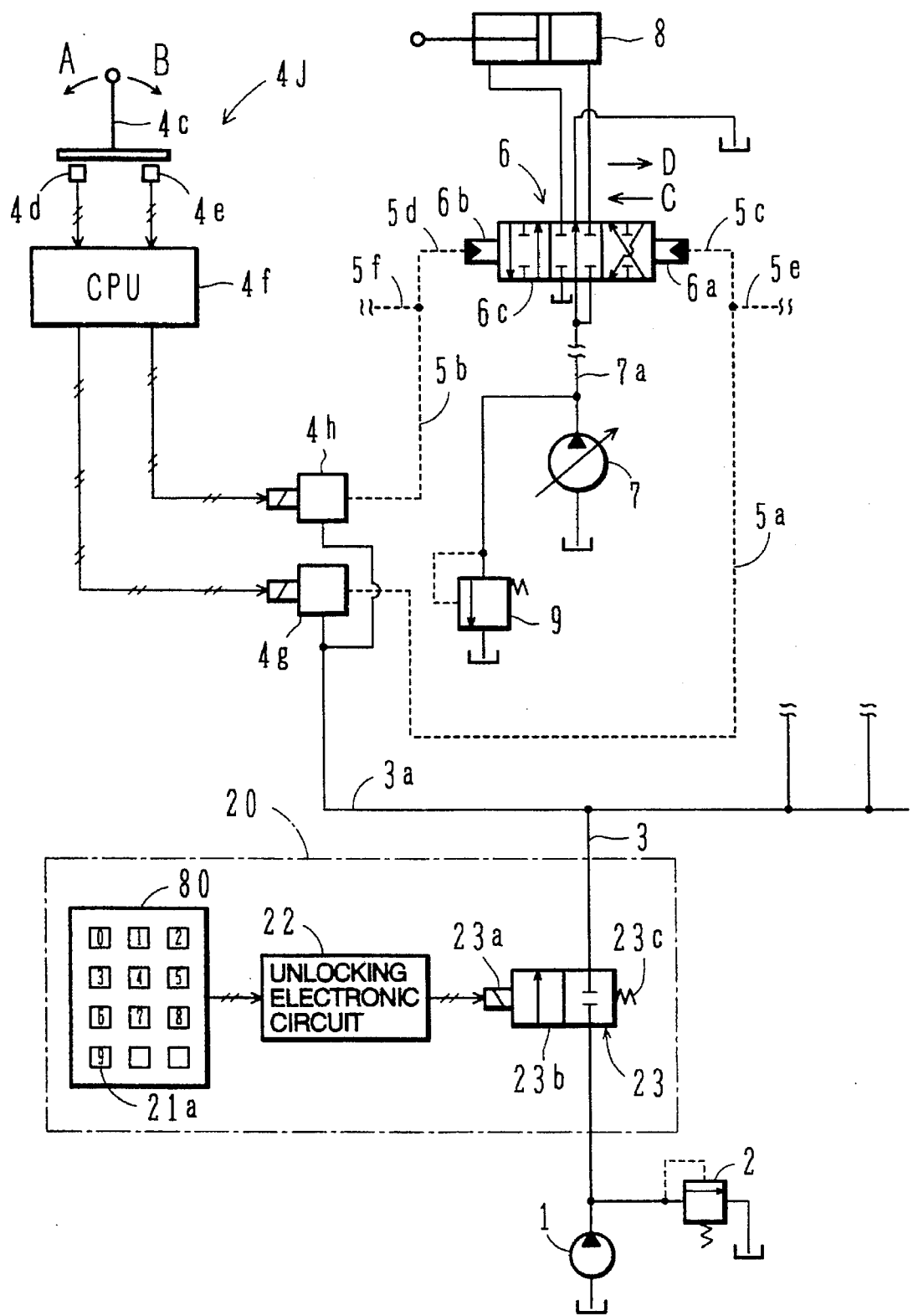
FIG. 13 is a diagram showing a hydraulic circuit of a hydraulic machine equipped with a burglarproof device according to an eleventh embodiment of the present invention.

An eleventh embodiment of the present invention will be described with reference to FIG. 13. In this embodiment, the pilot valve device for operating the actuator in the main hydraulic circuit is constituted by solenoid proportional pressure reducing valves which are operated by an electric lever. In FIG. 13, the same or equivalent members as those in FIG. 1 are denoted by the same reference numerals.

Referring to FIG. 13, denoted by 4J is an electric lever device comprising the manual lever 4c and a pair of potentiometers 4d, 4e for detecting the stroke of the manual lever 4c. Detection signals by the potentiometers 4d, 4e are subjected to predetermined processing in a CPU 4f and then output as electric command signals to solenoid proportional pressure reducing valves 4g, 4h. The solenoid proportional pressure reducing valves 4g, 4h correspond to the pressure reducing valves 4a, 4b of the pilot valve device 4, respectively, and function to reduce the pilot primary pressure depending on levels of the electric command signals, thereby producing pilot secondary pressures. The pilot secondary pressures are introduced to the hydraulic driving sectors 6a, 6b of the main control valve 6 through the pilot secondary pressure lines 5a, 5b for moving the main control valve 6. The remaining arrangement is the same as in the first embodiment.

Even for the case of employing the electric lever device 4J to operate the solenoid proportional pressure reducing valves 4g, 4h, the burglarproof device 20 can also be provided in the hydraulic system to protect the hydraulic machine against burglary as with the first embodiment.

A twelfth embodiment of the present invention will be described with reference to FIGS. 14 to 17. This embodiment intends to simply restart the operation in the work where the operation of the hydraulic machine is frequently started and stopped, without deteriorating a degree of the security of the burglarproof device against burglary. In FIGS. 14 to 17, the same or equivalent members as those in FIG. 1 are denoted by the same reference numerals.

Figure 14:
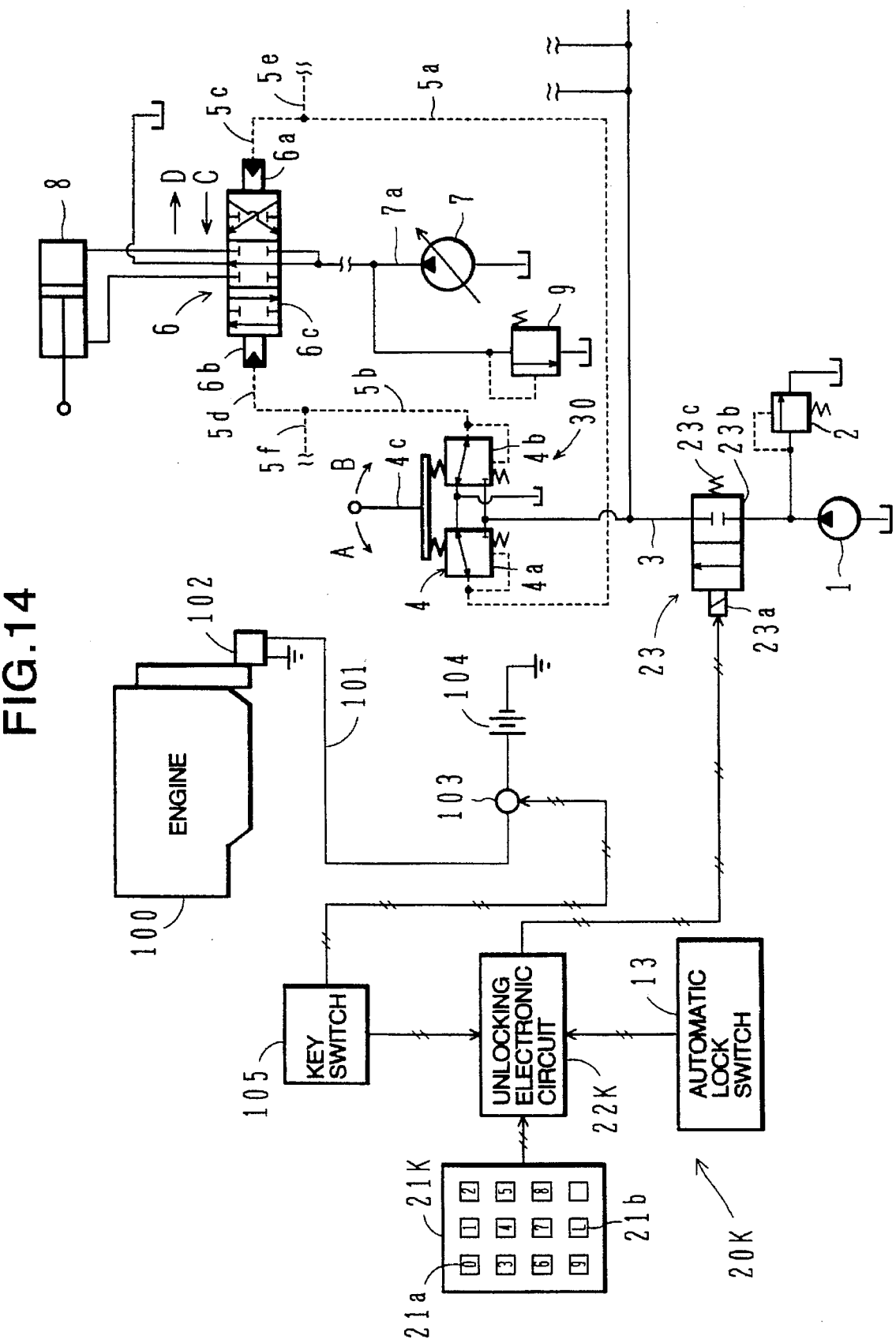
FIG. 14 is a diagram showing a hydraulic circuit of a hydraulic machine equipped with a burglarproof device according to a twelfth embodiment of the present invention.

Referring to FIG. 14, the engine 100 is provided with an engine start-up system 101 comprising a starter 102, a key switch start relay 103 and a battery 104. When a key switch 105 is turned on, the key switch start relay 103 is turned on and the starter 102 is rotated to start up the engine 100.

Denoted by 20K is a burglarproof device of this embodiment which comprises a key input unit 21K, an automatic lock switch 13, a key switch 105, an unlocking electronic circuit 22K to which signals from the key input unit 21K and the automatic lock switch 13 are transmitted, and the solenoid valve 23 as lock means disposed in the pilot primary pressure line 3 between the pilot hydraulic pump 1 and the pilot valve device 4.

The automatic lock switch 13 is an alternate switch (a switch holding the state after being changed over) which is selectively turned on and off by the operator. The key input unit 21K includes, in addition to the ten numeral keys 21a from 0 to 9, a lock button key (hereinafter referred to as a lock button) 21b which is selectively turned on and off by the operator. Information produced upon these keys and button being depressed is transmitted to the unlocking electronic circuit 22K. The ten numeral keys 21a and the lock button 21b are each a momentarily-operated switch which is turned on only while the operator is depressing it.

Figure 15:
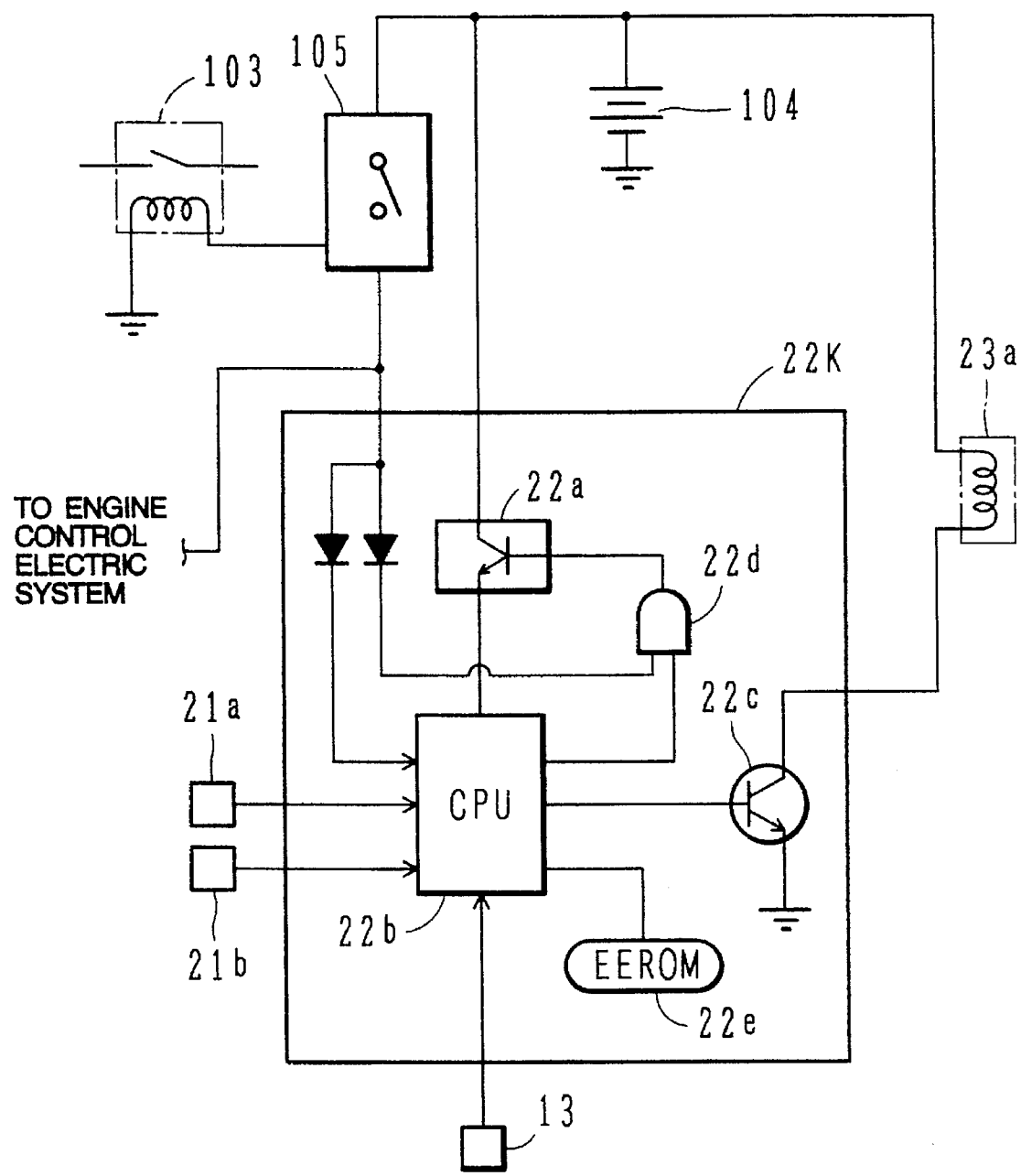
FIG. 15 is a circuit diagram showing an internal configuration of an unlocking electronic circuit.

The configuration of the unlocking electronic circuit 22K is shown in a circuit diagram of FIG. 15. The unlocking electronic circuit 22K comprises, as shown in FIG. 15, a power supply circuit 22a connected to a battery 104, a CPU 22b for receiving the signals from the key switch 105, the ten numeral keys 21a, the lock button 21b and the automatic lock switch 13, a power transistor 22c turned on and off by the CPU22b for electrically controlling operation of the solenoid driving sector 23a of the solenoid valve 23, an OR circuit 22d for turning off the power supply circuit 22a only when both the signals from the key switch 105 and the CPU 22b are turned off, and an EEROM 22e for storing the state of a lock flag (described later) when the power supply circuit 22a is turned off.

Figure 16:
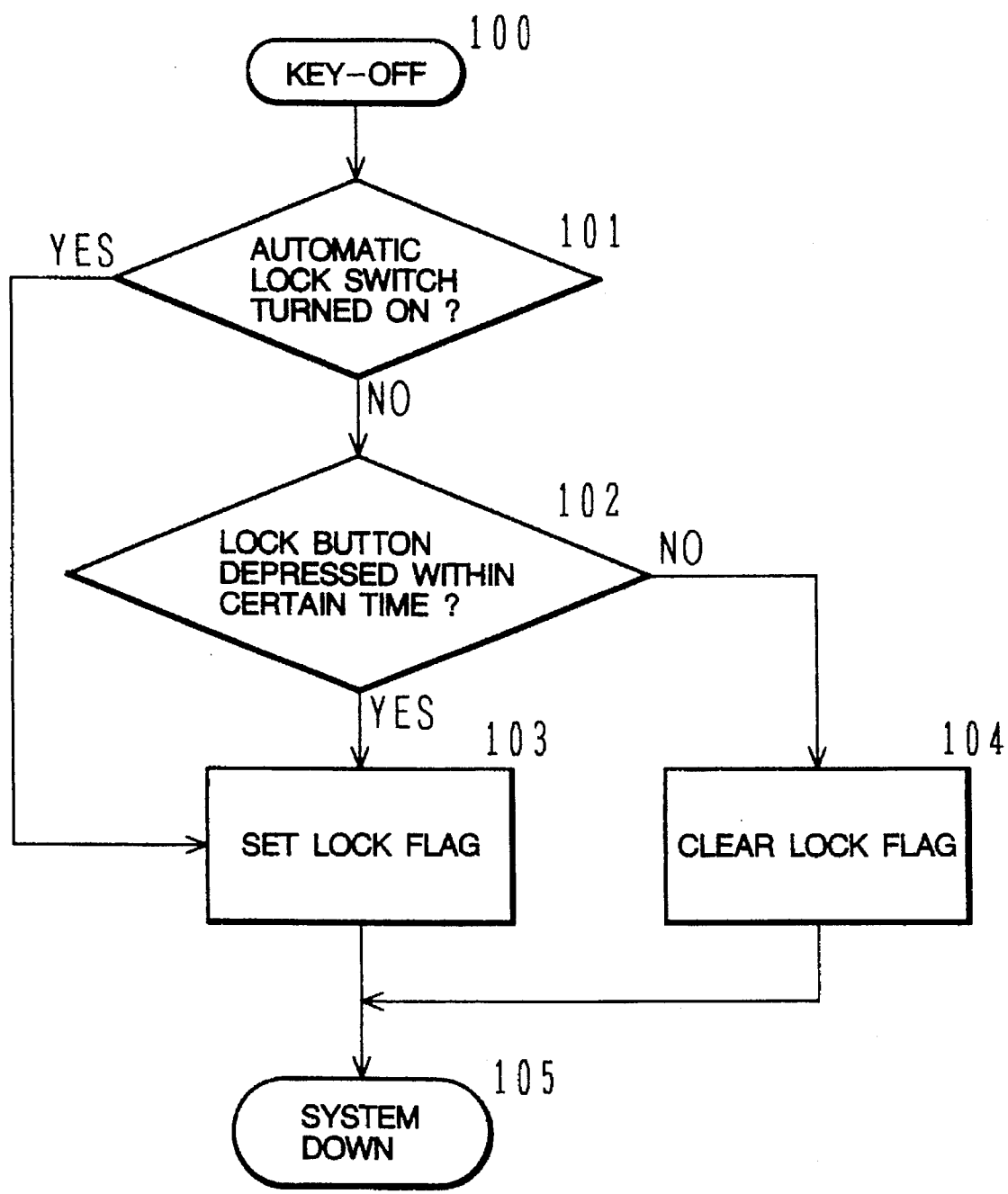
FIG. 16 is a flowchart showing a processing function executed by the unlocking electronic circuit when the hydraulic machine is stopped.
Figure 17:
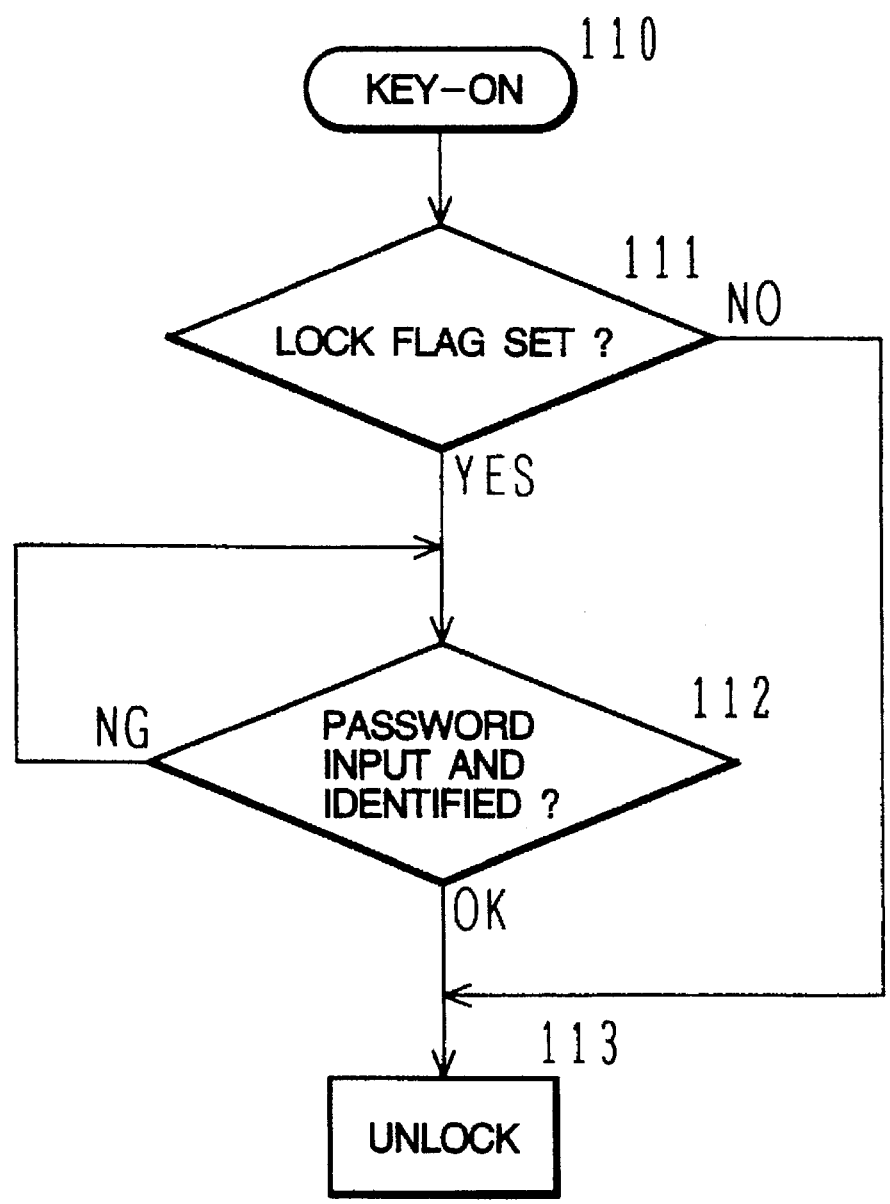
FIG. 17 is a flowchart showing a processing function executed by the unlocking electronic circuit when the hydraulic machine is started up.

The operation of this embodiment will now be described with reference to FIGS. 16 and 17. FIGS. 16 and 17 are flowcharts showing processing functions of the CPU 22b.

A description will be made, starting from a condition where the hydraulic machine is moving.

When the operator turns off the key switch 105 and an engine control electric system (not shown) is turned off to stop the engine 100, a signal indicating turning-off of the key switch (key-off) is sent to the CPU 22b of the unlocking electronic circuit 22K (step 100). At this time, the signal from the key switch 105 applied to one input terminal of the OR circuit 22d of the unlocking electronic circuit 22K is turned off, but the signal from the CPU 22b is kept on so that the power supply circuit 22a is not turned off. Subsequently, the CPU 22b checks the state of the automatic lock switch 13 (step 101). If the automatic lock switch 13 is turned on, then a lock flag is set (step 103). After that, the CPU 22b turns off the signal sent to the OR circuit 22d, thereby turning off the power supply circuit 22a and stopping the system of the unlocking electronic circuit 22K (system down) (step 105). At this time, the power transistor 22c is also turned off and the solenoid valve 23 is shifted to the closed position. On the other hand, the state of the lock flag is stored in the EEROM 22c of the unlocking electronic circuit 22K after the system down.

Next, if the automatic lock switch 13 is turned off when its state is checked, then the CPU 22b checks whether the lock button 21b is turned on or off (step 102). If the lock button 21b is depressed within a certain time after the key-off, then the lock flag is set (step 103), followed by the system down. On the other hand, if the lock button 21b is not depressed within the certain time after the key-off, then the lock flag is cleared (step 104), followed by the system down.

A description will be made of the operation in the case of the operator restarting the hydraulic machine.

When the operator turns on the key switch 105, the engine control electric system (not shown) is turned on and simultaneously a signal indicating turning-on of the key switch (key-on) is sent to the CPU 22b of the unlocking electronic circuit 22K (step 110). At this time, the signal from the key switch 105 applied to one input terminal of the OR circuit 22d of the unlocking electronic circuit 22K is turned on and, therefore, the power supply circuit 22a is turned on. Subsequently, the CPU 22b reads the state of the lock flag stored in the EEROM 22c and checks the state of the lock flag (step 111). If the lock flag is not set, then the lock means or the solenoid valve 23 is unlocked at once (step 113). Specifically, the power transistor 22c is turned on and the solenoid valve 23 is shifted to the open position (step 113).

In this condition, by further rotating the key switch 105 to turn on the start relay 103, the engine 1 starts rotation by the starter 102 and the actuator 8 can be operated with the pilot valve device 4.

On the other hand, if the lock flag is set when its state is checked, then the CPU 22b waits for input of the password from the ten numeral keys 21a. Upon receiving the password from the ten numeral keys 21a, the CPU 22b collates the input number with the password stored in a CPU built-in memory (step 112), and executes the operation of unlocking the lock means in the same manner as above only when both the passwords coincide with each other.

In the foregoing process, the functions of steps 100, 102, 103, 104 and 105, shown in FIG. 16, of the CPU 22b of the unlocking electronic circuit 22K constitute first unlocking control means which, at the time of the key switch 105 being turned off, sets a lock state and brings the unlocking electronic circuit 22K into the system down when the lock button 21b is turned on, and sets an unlock state and brings the unlocking electronic circuit 22K into the system down when the lock button 21b is turned off. The functions of steps 111, 112 and 113, shown in FIG. 17, of the CPU 22b of the unlocking electronic circuit 22K constitute second unlocking control means which generates the unlock signal in the case of the lock state being set only when the key switch 105 is turned on and the correct password (predetermined code) is entered to the key input device 21K, and which generates the unlock signal in the case of the unlock state being set simply when the key switch 105 is turned on.

Also, the function of step 101, shown in FIG. 16, of the CPU 22b of the unlocking electronic circuit 22K constitutes third unlocking control means which sets the lock or unlock state by the above first unlocking control means and brings the unlocking electronic circuit 22K into the system down when the key switch 105 is turned off with the automatic lock switch 13 turned off, and which always sets the lock state and brings the unlocking electronic circuit 22K into the system down when the key switch 105 is turned off with the automatic lock switch 13 turned on.

In this embodiment thus constructed, when the hydraulic machine is employed in the work field where its operation is frequently started up and stopped, the operator turns off the automatic lock switch 13 to set a manual lock mode. Then, upon the operation of the hydraulic machine being stopped, if the operator turns off the key switch 105 and also depresses the lock button 21b (to be turned on) within the certain time after that, the unlocking electronic circuit 22K is brought into the system down in the lock state. Therefore, when the operator turns on the key switch 105 at the subsequent start-up of the hydraulic machine, the hydraulic machine can be operated only when the input code coincides with the stored password as per in the ordinary lock arrangement. When the operator is engaged in work away from the machine for a while or takes a short pause, the unlocking electronic circuit 22K is brought into the system down in the unlock state if the operator turns off the key switch 105 alone and does not depress the lock button 21b. Therefore, at the subsequent start-up of the hydraulic machine, the hydraulic machine can be operated simply when the operator turns on the key switch 105. In other words, when the operation of the hydraulic machine is stopped in a normal manner, the system is brought down in the lock state as per in the ordinary lock arrangement if the lock button 21b is depressed. Thus, the hydraulic machine cannot be operated for the start-up by persons who do not know the password, and hence can be protected against burglary. When the operator is engaged in work away from the machine for a while or takes a short pause during the work where the machine operation is frequently started up and stopped, the system is brought down in the unlock state if the lock button 21b is not depressed. This allows the operation of the hydraulic machine to be restarted simply.

In the case of not requiring the changeover between the lock state and unlock state with the lock button 21b in the manual mode, or for the operator who tends to forget to set the lock state with the lock button 21b in the manual mode, it is possible to bring the system down in the lock state automatically as per in the ordinary lock arrangement when the key switch 105 is turns off, by holding the automatic lock switch 13 turned on at all times so as to set an automatic lock mode. As a result, the hydraulic machine cannot be operated for the start-up by persons who do not know the password, and hence can be protected against burglary.

Further, since the lock flag for setting the lock state is stored in the EEROM 22c of the unlocking electronic circuit 22K, all efforts at breaking the locked system will be in vain even if the burglar tampers with the automatic lock switch 13 of the hydraulic machine under the locked condition. Accordingly, the security of the burglarproof device itself is not affected at all and convenience in the operation is just improved.

In summary, with this embodiment, the operation of the hydraulic machine can be simply restarted in the work where the machine operation is frequently started up and stopped, without deteriorating a degree of the security against burglary.

Also, since the mode is changed over between the automatic lock mode where the lock state is set immediately when the key switch is turned off and the manual lock mode where the lock state is set only when the key switch is turned off and the lock button is depressed, convenience in the operation is much improved.

While the wireless system has been explained in the foregoing embodiment as the code input means other than the key input device, the code input means is not limited to the illustrated system, but may be of any desired type so long as it can input the predetermined code. For example, in place of the key input configuration, dial or touch panel input configuration may also be employed. Further, the password defined by one or a combination of alphabets a to z, for example, may be entered as the predetermined code rather than the numerical password defined by one or a combination of numerals.

As described hereinabove, the present invention can provide a burglarproof device which has a high degree of security against burglary, ensures high safety, and can be simply installed in a location where the device is hard to find for burglars.

What is claimed is:

1. A burglarproof device for a hydraulic machine provided with a hydraulic system comprising a main hydraulic system including a main hydraulic pump driven by a prime mover, a plurality of actuators driven by a hydraulic fluid delivered from said main hydraulic pump, and a plurality of main control valves for controlling respective flow rates of the hydraulic fluid supplied from said main hydraulic pump to said plurality of actuators; and a pilot hydraulic circuit including a pilot hydraulic pump driven by said prime mover and controlling said main hydraulic circuit with a pilot primary pressure produced by said pilot hydraulic pump, wherein said burglarproof device comprises:

code input means, an unlocking electronic circuit for generating an unlock signal when a predetermined code is entered to said code input means, and lock means disposed in at least one location in said hydraulic system for enabling said hydraulic system to operate when said unlock signal is generated, and disabling the operation of said hydraulic system when said unlock signal is not generated.

2. A burglarproof device for a hydraulic machine according to claim 1, wherein said lock means is disposed in said pilot hydraulic circuit.

3. A burglarproof device for a hydraulic machine according to claim 1, wherein said pilot hydraulic circuit includes a common hydraulic line for transmitting the pilot primary pressure of said pilot hydraulic pump to a plurality of pilot control portions, and said lock means is disposed in said common hydraulic line.

4. A burglarproof device for a hydraulic machine according to claim 1, wherein the unlock signal generated by said unlocking electronic circuit is an ON electric signal, and said lock means disables the operation of said hydraulic system when said ON electric signal is not generated.

5. A burglarproof device for a hydraulic machine according to claim 1, wherein said lock means is disposed in at least one hydraulic line of said hydraulic system, and includes valve means for cutting off said hydraulic line when said unlock signal is not generated.

6. A burglarproof device for a hydraulic machine according to claim 1, wherein said lock means is disposed in at least one hydraulic line of said hydraulic system, and includes valve means for communicating said hydraulic line with a reservoir when said unlock signal is not generated.

7. A burglarproof device for a hydraulic machine according to claim 1, wherein said lock means is disposed in at least two locations in said hydraulic system.

8. A burglarproof device for a hydraulic machine according to claim 1, wherein said code input means is a wireless receiver for receiving said predetermined code by radio from a wireless transmitter.

9. A burglarproof device for a hydraulic machine according to claim 8, wherein said wireless transmitter stores said predetermined code beforehand and, upon operation by an operator, transmits said predetermined code to said wireless receiver by radio.

10. A burglarproof device for a hydraulic machine according to claim 1, wherein said pilot hydraulic circuit includes a plurality of valve operating circuits for driving the respective main control valves in said main hydraulic circuit with said pilot primary pressure, and said lock means is disposed in at least one of said plurality of valve operating circuits.

11. A burglarproof device for a hydraulic machine according to claim 10, wherein said hydraulic machine has a boom and an arm which are coupled to each other in a relatively vertically movable manner, said plurality of actuators include a boom cylinder and an arm cylinder for driving said boom and said arm, respectively, and said lock means is disposed in the valve operating circuit for the main control valve associated with said boom cylinder.

12. A burglarproof device for a hydraulic machine according to claim 10, wherein said hydraulic machine has an undercarriage, said plurality of actuators include at least one track motor for driving said undercarriage, and said lock means is disposed in the valve operating circuit for the main control valve associated with said track motor.

13. A burglarproof device for a hydraulic machine according to claim 10, wherein said valve operating circuit comprises a pilot primary pressure line for transmitting the pilot primary pressure of said pilot hydraulic pump therethrough, pilot valve means connected to said pilot primary pressure line for converting said pilot primary pressure into a pilot secondary pressure, and a pilot secondary pressure line connected to said pilot valve means for transmitting said pilot secondary pressure to the corresponding main control valve, and said lock means is disposed in at least one of said pilot primary pressure line and said pilot secondary pressure line.

14. A burglarproof device for a hydraulic machine according to claim 10, wherein said main control valve includes a spool and a pair of hydraulic driving sectors arranged at both ends of said spool to face each other, said valve operating circuit includes, as said pilot secondary pressure line, a pair of pilot secondary pressure lines connected respectively said pair of hydraulic driving sectors, and said lock means includes an on/off valve for communicating said pair of pilot secondary pressure lines with each other when said unlock signal is not generated.

15. A burglarproof device for a hydraulic machine according to claim 1, wherein said pilot hydraulic circuit includes a pump control circuit for controlling a delivery rate of said main hydraulic pump with said pilot primary pressure, and said lock means is disposed in said pump control circuit.

16. A burglarproof device for a hydraulic machine according to claim 1, wherein said pilot hydraulic circuit includes a pilot relief valve for keeping said pilot primary pressure constant, and said lock means is relief pressure regulating means provided in said pilot relief valve for reducing a setting pressure of said pilot relief valve when said unlock signal is not generated.

17. A burglarproof device for a hydraulic machine according to claim 1, wherein said main hydraulic circuit includes a hydraulic fluid supply line for supplying the hydraulic fluid delivered from said main hydraulic pump to said plurality of main control valves, and said lock means is disposed in said hydraulic fluid supply line.

18. A burglarproof device for a hydraulic machine according to claim 1, wherein said main hydraulic circuit includes a main relief valve for restricting an upper limit of the delivery pressure of said main hydraulic pump, and said lock means is relief pressure regulating means provided in said main relief valve for reducing a setting pressure of said main relief valve when said unlock signal is not generated.

19. A burglarproof device for a hydraulic machine according to claim 1, further comprising lock input means operated by an operator for instructing whether a lock state is to be set or not, wherein said unlocking electronic circuit comprises:

first unlocking control means which, at the time of turning-off of a key switch for controlling start-up and stop of said prime mover, sets the lock state and brings said unlocking electronic circuit into the system down when said lock input means instructs setting of the lock state, and sets an unlock state and brings said unlocking electronic circuit into the system down when said lock input means does not instruct setting of the lock state, and second unlocking control means which generates said unlock signal in the case of said lock state being set only when said key switch is turned on and the predetermined code is entered to said code input means, and which generates said unlock signal in the case of said unlock state being set simply when said key switch is turned on.

20. A burglarproof device for a hydraulic machine according to claim 19, further comprising automatic lock input means operated by an operator for instructing whether automatic lock is to be set or not, wherein said unlocking electronic circuit further comprises third unlocking control means which sets the lock or unlock state by said first unlocking control means and brings said unlocking electronic circuit into the system down when said key switch is turned off in a condition where said automatic lock input means does not instruct setting of the automatic lock, and which always sets the lock state and brings said unlocking electronic circuit into the system down when said key switch is turned off in a condition where said automatic lock input means instruct setting of the automatic lock.

* * * * *